(12) United States Patent
Fan et al.

(10) Patent No.: US 9,331,821 B2
(45) Date of Patent: May 3, 2016

(54) DATA RETRANSMISSION METHOD, APPARATUS, AND SYSTEM

(71) Applicant: Huawei Technologies Co., Ltd., Shenzhen (CN)

(72) Inventors: Shuju Fan, Shanghai (CN); Xueli Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/611,979

(22) Filed: Feb. 2, 2015

(65) Prior Publication Data
US 2015/0155976 A1      Jun. 4, 2015

Related U.S. Application Data

(63) Continuation of application No. PCT/CN2012/079608, filed on Aug. 2, 2012.

(51) Int. Cl.
*H04L 1/18* (2006.01)
*H04L 1/08* (2006.01)
(Continued)

(52) U.S. Cl.
CPC .............. *H04L 1/1893* (2013.01); *H04L 1/08* (2013.01); *H04L 1/16* (2013.01); *H04L 1/1816* (2013.01); *H04L 1/1819* (2013.01); *H04L 1/1861* (2013.01); *H04L 1/1867* (2013.01); *H04L 1/1896* (2013.01); *H04L 1/06* (2013.01); *H04L 1/1671* (2013.01)

(58) Field of Classification Search
CPC ... H04L 1/1893; H04L 1/1861; H04L 1/1816; H04L 1/1819; H04L 1/1896
See application file for complete search history.

(56) References Cited

U.S. PATENT DOCUMENTS 7,031,419 B2 *  4/2006  Piirainen ................... 375/358
7,058,367 B1 *  6/2006  Luo et al. .................. 455/101
(Continued)

FOREIGN PATENT DOCUMENTS

CN      101686116 A      3/2010
CN      101873207 A      10/2010
(Continued)

OTHER PUBLICATIONS

"3rd Generation Partnership Project; Technical Specification Group Radio Access Network; Multiplexing and channel coding (FDD) (Release 11)," 3GPP TS 25.212, V11.2.0, Jun. 2012, 130 pages.

(Continued)

*Primary Examiner* — Joseph D Torres
(74) *Attorney, Agent, or Firm* — Slater & Matsil, L.L.P.

(57) ABSTRACT

The present invention discloses a data retransmission method, apparatus, and system, and relates to the field of communications. In a data retransmission method, a special codeword is determined according to a difference between a number of layers selected by a transmitter and the number of layers that need to be occupied for retransmitting a codeword. The number of layers that need to be occupied by the codeword to be retransmitted is smaller than the number of layers selected by the transmitter and no new data needs to be transmitted and wherein the number of transport blocks comprised in the special codeword is equal to the difference. The codeword that needs to be retransmitted and the special codeword are allocated to each transport layer through a layer mapping.

8 Claims, 5 Drawing Sheets

(51) Int. Cl.
*H04L 1/16* (2006.01)
*H04L 1/06* (2006.01)

(56) References Cited

U.S. PATENT DOCUMENTS

| | | | | |
|---|---|---|---|---|
| 7,298,717 | B2 * | 11/2007 | Hui et al. | 370/329 |
| 7,515,649 | B2 * | 4/2009 | Shim et al. | 375/299 |
| 7,532,600 | B2 * | 5/2009 | Hu et al. | 370/335 |
| 7,684,527 | B2 * | 3/2010 | Yokoyama | 375/347 |
| 7,826,871 | B2 * | 11/2010 | Sudo | 455/562.1 |
| 7,889,708 | B2 * | 2/2011 | Ihm et al. | 370/343 |
| 7,948,901 | B2 * | 5/2011 | Lee | 370/238 |
| 8,064,428 | B2 * | 11/2011 | Bar-Ness et al. | 370/349 |
| 8,112,694 | B1 * | 2/2012 | Woo et al. | 714/774 |
| 8,261,150 | B2 * | 9/2012 | Murakami et al. | 714/749 |
| 8,291,275 | B2 * | 10/2012 | Miyoshi et al. | 714/748 |
| 8,341,483 | B2 * | 12/2012 | Yokoyama | 714/749 |
| 8,347,161 | B2 * | 1/2013 | Park et al. | 714/748 |
| 8,374,276 | B2 * | 2/2013 | Hoshino et al. | 375/267 |
| 8,386,876 | B2 * | 2/2013 | Khoshnevis et al. | 714/751 |
| 8,428,161 | B2 * | 4/2013 | Sun et al. | 375/260 |
| 8,448,038 | B2 * | 5/2013 | Kwon et al. | 714/748 |
| 8,462,878 | B2 * | 6/2013 | Choi et al. | 375/295 |
| 8,639,999 | B2 * | 1/2014 | Miki et al. | 714/751 |
| 8,861,628 | B2 * | 10/2014 | Roh et al. | 375/267 |
| 9,054,868 | B2 * | 6/2015 | Sun et al. | |
| 2003/0012318 | A1 * | 1/2003 | Piirainen | 375/358 |
| 2004/0057530 | A1 * | 3/2004 | Tarokh et al. | 375/267 |
| 2005/0255805 | A1 * | 11/2005 | Hottinen | 455/8 |
| 2007/0153672 | A1 * | 7/2007 | Terry et al. | 370/206 |
| 2007/0286234 | A1 * | 12/2007 | Gutman et al. | 370/468 |
| 2008/0160912 | A1 * | 7/2008 | Kim et al. | 455/15 |
| 2008/0192718 | A1 * | 8/2008 | Jongren et al. | 370/342 |
| 2008/0229168 | A1 * | 9/2008 | Murakami et al. | 714/751 |
| 2009/0282310 | A1 * | 11/2009 | Seok et al. | 714/748 |
| 2010/0017675 | A1 * | 1/2010 | Ihm et al. | 714/751 |
| 2010/0067459 | A1 | 3/2010 | Göransson et al. | |
| 2010/0211842 | A1 * | 8/2010 | Moon et al. | 714/748 |
| 2011/0126072 | A1 * | 5/2011 | Yoshimoto et al. | 714/751 |
| 2011/0246530 | A1 | 10/2011 | Malafsky | |

FOREIGN PATENT DOCUMENTS

| | | |
|---|---|---|
| CN | 101917261 A | 12/2010 |
| EP | 2375607 A1 | 10/2011 |
| WO | 2009022872 A2 | 2/2009 |

OTHER PUBLICATIONS

Efficient Support of Retransmission Using Codeword DTX and Signaling, 3GPP TSG RAN WG1 #51bis, R1-080263, Agenda Item: 6.1.3, Jan. 14-18, 2008, 4 pages.
Four Branch MIMO Trasmissions for HSDPA, 3GPP TSG-RAN Meeting #56, RP-120480, Jun. 13-15, 2012, 7 pages.

* cited by examiner

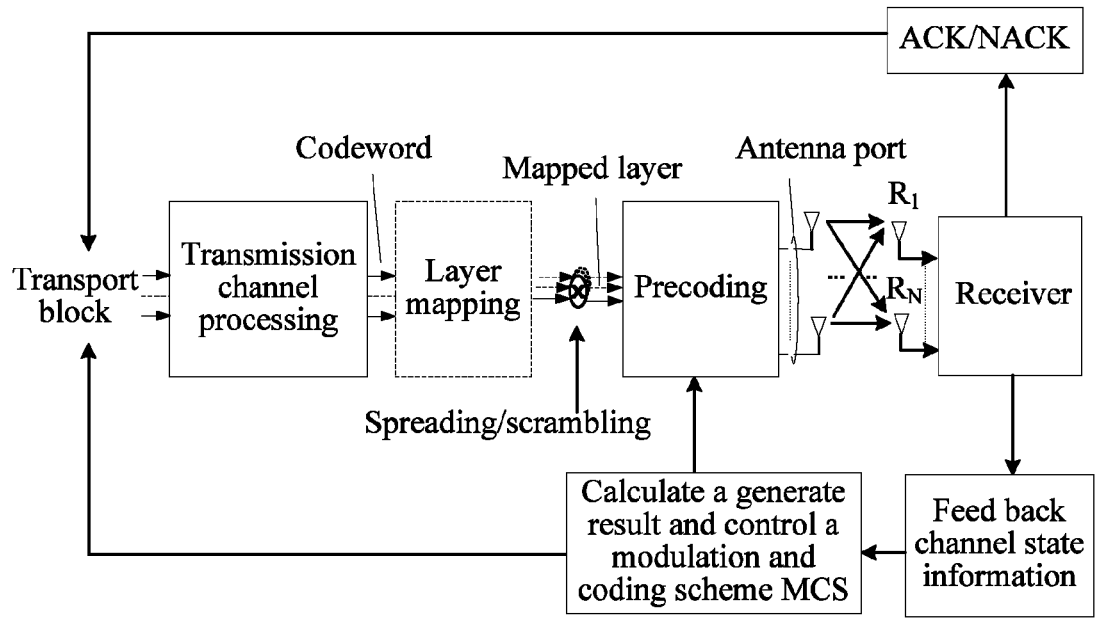

FIG. 1

A transmitter, in a situation that the number of layers that need to be occupied by a retransmitted codeword is smaller than the number of layers which is selected by the transmitter to use and no new data needs to be transmitted, determines a special codeword according to a difference between the number of layers which is selected by the transmitter and the number of layers that need to be occupied for retransmitting the codeword — S101

The transmitter allocates the codeword that needs to be retransmitted and the special codeword to each transport layer through a layer mapping relationship — S102

FIG. 2

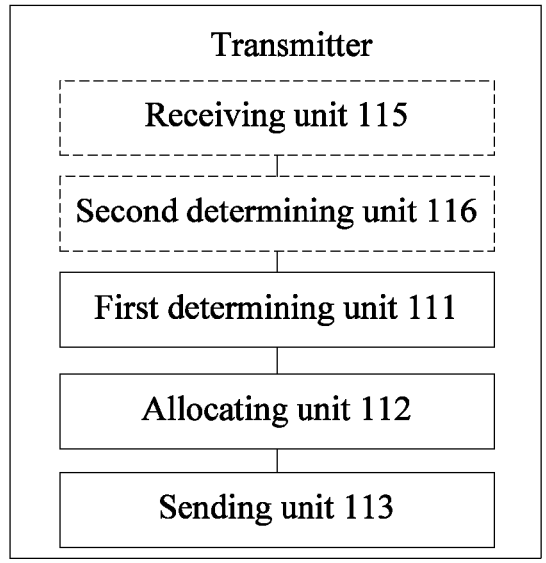
FIG. 11
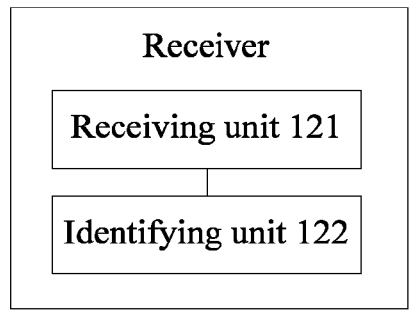
FIG. 12
| TB$_1$ | 0 | 1 | 2 | 3 | 4 | 5 | 6 | 7 |
| TB$_3$ | 0 | 1 | 2 | 3 | 4 | 5 | 6 | 7 |
| TB$_2$ | 8 | 9 | 10 | 11 | 12 | 13 | 14 | 15 |
| TB$_4$ | 8 | 9 | 10 | 11 | 12 | 13 | 14 | 15 |
FIG. 13

DATA RETRANSMISSION METHOD, APPARATUS, AND SYSTEM

This application is a continuation of International Application No. PCT/CN2012/079608, filed on Aug. 2, 2012, which is hereby incorporated by reference in its entirety.

TECHNICAL FIELD

The present invention relates to the field of communications, and in particular, to a data retransmission method, apparatus, and system.

BACKGROUND

With rapid development of communications technologies, in a 2×2 MIMO (Multiple-Input Multiple-Output) technology introduced into the version Rel-7 formulated by the 3GPP (3rd Generation Partnership Project), a transport block length indication and a modulation indication of each data flow are independent, a NodeB (base station) informs a UE (User Equipment) of only a process number $HAP_{pb}$ of a primary transport block no matter single-current data or double-current data is scheduled, and a process number of a secondary transport block may be calculated according to the process number of the primary transport block:

$$HAP_{sb}=(HAP_{pb}+N_{proc}/2)\mod(N_{proc}).$$

In Rel-7 MIMO, the total number of processes satisfies $6 \leq N_{proc}/2 \leq 8$, that is, the number of processes of each flow is 6-8 on average.

When 4-antenna MIMO is used, basic data transmission is roughly shown in FIG. 1. After the 3GPP standard conference decides to introduce 4×4MIMO, still at most 2 transport block length indications and 2 modulation indications are used. Each piece of indication information can control at most 2 TBs (Transport Block). Data obtained by coding 1 or 2 TBs using a same set of control information is collectively called a codeword (CW for short). The code is borne at each transport layer after undergoing layer mapping. Data of each transport layer is transferred to multiple antenna ports after being pre-coded, and is sent at an air interface to a receiver after being superimposed with other data signals. Upon receiving air interface data information and corresponding control information, the receiver performs operations such as demodulation decoding, and feeds ACK back/NACK for each codeword to a transmitter according to whether data passes CRC (Cyclic Redundancy Check) verification. If the transmitter receives a NACK feedback, a corresponding codeword needs to be retransmitted.

Currently, in the foregoing process of MIMO-based data retransmission processing, the number of layers or the number of TBs corresponding to each retransmitted codeword does not change, and the sequence of retransmitted codewords remains unchanged; if at the moment, no new data needs to be transmitted, a case that the number of layers that shall be used is greater than the number of layers required for retransmitting the codeword may occur, and in this case, behaviors of the transmitter are not defined yet, so that the transmitter does not know how to perform processing, which may possibly cause it difficult for the transmitter and the receiver to work normally.

SUMMARY

Embodiments of the present invention provide an MIMO-based data retransmission method, apparatus, and system so as to solve a problem that it may be difficult for a transmitter and a receiver to work normally in a case that in a process of MIMO-based data retransmission processing, the number of layers selected by the transmitter to use is greater than the number of layers required for retransmitting a codeword and no new data needs to be transmitted.

In order to solve the problem, the embodiments of the present invention adopt the following technical solutions.

In a first aspect, an embodiment of the present invention provides a data retransmission method, including: in a case that the number of layers that need to be occupied by a codeword to be retransmitted is smaller than the number of layers selected by a transmitter to use and no new data needs to be transmitted, determining a special codeword according to a difference between the number of layers selected by the transmitter and the number of layers that need to be occupied for retransmitting the codeword, where the number of transport blocks included in the special codeword is equal to the difference; and allocating the codeword that needs to be retransmitted and the special codeword to each transport layer through a layer mapping.

With reference to the first aspect, in a first possible implementation manner, the method further includes: sending a special codeword transmission indication to the receiver, where the special codeword transmission indication is used to identify that current data transmission includes a special codeword.

With reference to any one of the first aspect and the first possible implementation manner, in a second possible implementation manner, the special codeword is a virtual codeword, and the virtual codeword is void information; or, the special codeword is a filling codeword, and the filling codeword is any non-void information.

With reference to any one of the first aspect and the first two possible implementation manners, in a third possible implementation manner, the process of sending a special codeword transmission indication to the receiver further includes: carrying the special codeword transmission indication on an HS-SCCH, so as to send the special codeword transmission indication to the receiver.

With reference to the third possible implementation manner, in a fourth possible implementation manner, the carrying the special codeword transmission indication on an HS-SCCH includes: adding, to a packet including data transmission related control information, a bit, which is used to identify the special codeword transmission indication, and carrying the packet on the HS-SCCH; or setting at least one control information field in a packet including data transmission related control information to a specific value, which is used to identify the special codeword transmission indication, and carrying the packet on the HS-SCCH.

With reference to any one of the first aspect and the first four possible implementation manners, in a fifth possible implementation manner, the special codeword transmission indication is further used to identify which codeword is a special codeword, and/or identify which codeword is the codeword to be transmitted.

In a second aspect, an embodiment of the present invention provides a data retransmission method, including: receiving codewords, data transmission related control information, and a special codeword transmission indication, which are sent by the transmitter, where the data transmission related control information includes a process number indication; the codewords include a retransmitted codeword and a special codeword, and the special codeword transmission indication is used to identify that current data transmission includes a special codeword; and upon detecting the special codeword transmission indication, identifying the retransmitted codeword and/or the special codeword in the codewords according to the process number indication.

With reference to the second aspect, in a first possible implementation manner, the identifying the retransmitted codeword and/or the special codeword in the codewords according to the process number indication includes: determining whether buffered data corresponding to a process indicated by the process number indication or an associated process of the process is correctly decoded; if the buffered data is not correctly decoded, identifying that a transport block corresponding to the indicated process or the associated process in the current data transmission belongs to the retransmitted codeword; or, if the buffered data is correctly decoded, identifying that a transport block corresponding to the indicated process or the associated process in the current data transmission belongs to the special codeword.

In a third aspect, an embodiment of the present invention provides a data retransmission method, including: receiving codewords and a special codeword transmission indication, which are sent by the transmitter, where the codewords include: a retransmitted codeword and a special codeword, and the special codeword transmission indication is used to identify that current data transmission includes a special codeword, and is used to identify which codeword is the special codeword or identify which codeword is the retransmitted codeword; and identifying the retransmitted codeword and/or the special codeword in the codewords according to the special codeword transmission indication.

In a fourth aspect, an embodiment of the present invention provides a transmitter, including: a determining unit, configured to, in a case that the number of layers that need to be occupied by a codeword to be retransmitted is smaller than the number of layers selected by the transmitter to use and no new data needs to be transmitted, determine a special codeword according to a difference between the number of layers selected by the transmitter and the number of layers that need to be occupied for retransmitting the codeword, where the number of transport blocks included in the special codeword is equal to the difference; and an allocating unit, configured to allocate the codeword that needs to be retransmitted and the special codeword determined by the determining unit to each transport layer through a layer mapping.

With reference to the fourth aspect, in a first possible implementation manner, a transmitter provided by the embodiment of the present invention further includes: a sending unit, configured to send a special codeword transmission indication to the receiver, where the special codeword transmission indication is used to identify that current data transmission includes a special codeword.

In a fifth aspect, an embodiment of the present invention provides a receiver, including: a receiving unit, configured to receive codewords, data transmission related control information, and a special codeword transmission indication, which are sent by the transmitter, where the data transmission related control information includes a process number indication; the codewords include a retransmitted codeword and a special codeword, and the special codeword transmission indication is used to identify that current data transmission includes a special codeword; and an identifying unit, configured to, upon detecting the special codeword transmission indication, identify the retransmitted codeword and/or the special codeword in the codewords according to the process number indication.

In a sixth aspect, an embodiment of the present invention provides a receiver, including: a receiving unit, configured to receive codewords and a special codeword transmission indication, which are sent by the transmitter, where the codewords include: a retransmitted codeword and a special codeword, and the special codeword transmission indication is used to identify that current data transmission includes a special codeword, and is used to identify which codeword is the special codeword or identify which codeword is the retransmitted codeword; and an identifying unit, configured to identify the retransmitted codeword and/or the special codeword in the codewords according to the special codeword transmission indication received by the receiving unit.

In a seventh aspect, an embodiment of the present invention provides a data retransmission method, including: when needing to retransmit a part of codewords or all codewords, determining, by a transmitter, that the number of layers used for transmission is the number of layers that need to be occupied for retransmitting the part of codewords or is the number of layers that need to be occupied for retransmitting a part of all the codewords; allocating, through a layer mapping, transport blocks included in the part of codewords that need to be retransmitted or the part of all the codewords that need to be retransmitted, to each transport layer corresponding to the number of layers used for transmission; and sending data transmission related control information to a receiver, where the data transmission related control information includes a rank indication RI and a process number indication.

With reference to the seventh aspect, in a first possible implementation manner, the allocating, through a layer mapping, transport blocks included in the part of codewords that need to be retransmitted or the part of all the codewords that need to be retransmitted, to each transport layer corresponding to the number of layers used for transmission includes: mapping a transport block included in the part of codewords that need to be retransmitted or the part of all the codewords that need to be retransmitted, into a reprocessed codeword through the number of layers used for transmission and a transport-block-to-codeword mapping, and allocating, through the layer mapping, the reprocessed codeword to each transport layer corresponding to the number of layers used for transmission.

With reference to the first possible implementation manner, in a second possible implementation manner, the transport-block-to-codeword mapping includes that: a codeword corresponds to transport blocks having a same process number or transport blocks having process numbers with a difference being in a given relationship.

With reference to the first or second possible implementation manner, in a third possible implementation manner, the transport-block-to-codeword mapping further includes that: when the number of layers used for transmission is 2, if two transport blocks are transmitted initially, or if the RI is 2 during previous transmission and the two transport blocks both need to be retransmitted and a difference between process numbers of the two transport blocks is a first fixed value, a process number of a transport block corresponding to a specific codeword and a process number of a transport block corresponding to a non-specific codeword are different, and a difference between the two process numbers is the first fixed value.

With reference to the second or third possible implementation manner, a fourth possible implementation manner, the method further includes: if the number of layers used for transmission is 2, and current transmission is to retransmit a part of codewords in the previous transmission in which RI>2, setting at least one control information field of a packet including the data transmission related control information to a special indication, where the special indication is used to, when the number of layers used for transmission is 2, identify that process numbers of the transport block in the non-specific codeword and the transport block in the specific codeword are the same or in the given relationship (for example, a difference between the process numbers is a second fixed value); or, adding a bit to a packet including the data transmission related control information, where the bit is used to transmit the special indication in a case that the number of layers used for transmission is 2 and the current transmission is to retransmit a part of codewords in the previous transmission in which RI>2.

With reference to any one of the seventh aspect and the first four possible implementation manners, in a fifth possible implementation manner, if HARQ-ACK information received by the transmitter for both two processes being retransmission binding processes to each other is ACK, the transmitter determines that codewords transmitted by the two processes are both correctly decoded, and otherwise, when a maximum number of retransmissions is not reached, retransmits again the codewords transmitted by the two processes.

In an eighth aspect, an embodiment of the present invention provides a data retransmission method, including: receiving, by a receiver, a codeword and data transmission related control information sent by a transmitter, where the data transmission related control information includes an RI and a process number indication; and identifying, according to the RI, the process number indication, and a transport-block-to-codeword mapping, a transport block combination corresponding to the codeword.

With reference to the eighth aspect, in a first possible implementation manner, the identifying, according to the RI, the process number indication, and a transport-block-to-codeword mapping, a transport block combination corresponding to the codeword includes: when the RI is 2, checking whether buffered data corresponding to a retransmission binding process of a process indicated by the process number indication is correctly decoded; if the buffered data is not correctly decoded, identifying that a process number of a transport block in a non-specific codeword and a process number in the process number indication are the same or in a given relationship; if the buffered data is correctly decoded, identifying that a difference between the process number of the transport block in the non-specific codeword and the process number in the process number indication is a first fixed value.

With reference to the eighth aspect, in a second possible implementation manner, the identifying, according to the RI, the process number indication, and a transport-block-to-codeword mapping, a transport block combination corresponding to the codeword includes: when the RI is 2, checking whether a packet of the data transmission related control information is configured with a special indication; if the packet is configured with the special indication, identifying that a process number of a transport block in a non-specific codeword and a process number in the process number indication are the same or in a given relationship; if the packet is not configured with the special indication, identifying that a difference between the process number of the transport block in the non-specific codeword and the process number in the process number indication is a first fixed value, where the special indication is used to, when the number of layers used for transmission is 2, identify that the process numbers of the transport block in the non-specific codeword and the transport block in the specific codeword are the same or in a given relationship.

With reference to any one of the eight aspect and the first two possible implementation manners, in a third possible implementation manner, the method further includes: if the number of layers used in the current transmission is 2 and the processes corresponding to the transport blocks in two codewords received by the receiver are the retransmission binding processes to each other, and, when and only when the transport blocks in the two codewords are both correctly decoded, feeding, by the receiver, ACK back to the transmitter for the two codewords at the same time, and otherwise, feeding back NACK at the same time.

In a ninth aspect, an embodiment of the present invention provides a transmitter, including: a first determining unit, configured to, when a part of codewords or all codewords need to be retransmitted, determine that the number of layers used for transmission is the number of layers that need to be occupied for retransmitting the part of codewords or is the number of layers that need to be occupied for retransmitting a part of all the codewords; an allocating unit, configured to, allocate, through a layer mapping, transport blocks included in the part of codewords that need to be retransmitted or the part of all the codewords that need to be retransmitted to each transport layer corresponding to the number, determined by the first determining unit, of layers used for transmission; and a sending unit, configured to send data transmission related control information to a receiver, where the data transmission related control information includes a rank indication RI and a process number indication.

With reference to the ninth aspect, in a first possible implementation manner, the transmitter further includes a setting unit, where the setting unit is further configured to, in a case that the number of layers used for transmission is 2 and a part of codewords in previous transmission in which RI>2 are retransmitted during current transmission, set at least one control information field of a packet including the data transmission related control information to a special indication, where the special indication is used to, when the number of layers used for transmission is 2, identify that process numbers of a transport block in a non-specific codeword and a transport block in a specific codeword are the same or in a given relationship; or, add a bit to a packet including the data transmission related control information, where the bit is used to transmit the special indication in a case that the number of layers used for transmission is 2 and the current transmission is to retransmit a part of codewords in the previous transmission in which RI>2.

With reference to the ninth aspect and the first possible implementation manner, in a second possible implementation manner, the transmitter further includes: a receiving unit, configured to receive HARQ-ACK information for a process; and a second determining unit, configured to, when HARQ-ACK information, for both two processes being retransmission binding processes to each other, received by the receiving unit is ACK, determine that codewords transmitted by the two processes are both correctly decoded; otherwise, determine that the codewords transmitted by the two processes both need to be retransmitted.

In a tenth aspect, an embodiment of the present invention provides a receiver, including: a receiving unit, configured to receive a codeword and data transmission related control information sent by a transmitter, where the data transmission related control information includes an RI and a process number indication; and an identifying unit, configured to, according to the RI, the process number indication, and a transport-block-to-codeword mapping, identify a transport block combination corresponding to the codeword.

With reference to a tenth aspect, in a first possible implementation manner, the receiver further includes: a feedback unit, configured to, if the number of layers used in the current transmission is 2 and processes corresponding to transport blocks in two codewords received by the receiver are retransmission binding processes to each other, and when and only when the transport blocks in the two codewords are both correctly decoded, feed back ACK to the transmitter for the two codewords at the same time, and otherwise, feed back NACK at the same time.

In an eleventh aspect, an embodiment of the present invention further provides a data retransmission system, including: a transmitter and a receiver. The transmitter is configured to, in a case that the number of layers that need to be occupied by a codeword to be retransmitted is smaller than the number of layers selected by the transmitter to use and no new data needs to be transmitted, determine a special codeword according to a difference between the number of layers selected by the transmitter and the number of layers that need to be occupied for retransmitting the codeword, where the number of transport blocks included in the special codeword is equal to the difference; and allocate the codeword that needs to be retransmitted and the special codeword to each transport layer through a layer mapping.

With reference to the eleventh aspect, in a first possible implementation manner, the transmitter is further configured to send a special codeword transmission indication to the receiver, and the special codeword transmission indication is used to identify that current data transmission includes a special codeword.

The receiver is configured to receive codewords, data transmission related control information, and the special codeword transmission indication, which are sent by the transmitter, where the data transmission related control information includes a process number indication; the codewords include the retransmitted codeword and the special codeword, and the special codeword transmission indication is used to identify that the current data transmission includes a special codeword; and, upon detecting the special codeword transmission indication, identify the retransmitted codeword and/or the special codeword in the codewords according to the process number indication.

With reference to the eleventh aspect, in a second possible implementation manner, the transmitter is further configured to send a special codeword transmission indication to the receiver, and the special codeword transmission indication is used to identify that current data transmission includes a special codeword.

The receiver is configured to receive codewords and the special codeword transmission indication, which are sent by the transmitter, where the codewords include: the retransmitted codeword and the special codeword, and the special codeword transmission indication is used to identify that the current data transmission includes a special codeword, and is used to identify which codeword is the special codeword or identify which codeword is the retransmitted codeword; and identify the retransmitted codeword and/or the special codeword in the codewords according to the special codeword transmission indication.

In a twelfth aspect, an embodiment of the present invention provides a data retransmission system, which includes a transmitter and a receiver. The transmitter is configured to, when a part of codewords or all codewords need to be retransmitted, determine that the number of layers used for transmission is the number of layers that need to be occupied for retransmitting the part of codewords or is the number of layers that need to be occupied for retransmitting a part of all the codewords; allocate, through a layer mapping, transport blocks included in the part of codewords that need to be retransmitted or a part of all the codewords that need to be retransmitted to each transport layer corresponding to the number, determined by the first determining unit, of layers used for transmission; and send data transmission related control information to the receiver, where the data transmission related control information includes a rank indication RI and a process number indication.

The receiver is configured to receive the codeword and the data transmission related control information, which are sent by the transmitter, where the data transmission related control information includes the RI and the process number indication; and identify a transport block combination corresponding to the codeword according to the RI, the process number indication, and a transport-block-to-codeword mapping.

The embodiments of the present invention provide an MIMO-based data retransmission method, apparatus, and system. A solution is that: when a transmitter needs to retransmit data, and in a case that the number of layers required by the data to be retransmitted is smaller than the number of layers selected by the transmitter and no new data needs to be transmitted, a special codeword is transmitted, so that data retransmission is performed normally in the specific case. Another solution is that: in a data retransmission processing process, when a transmitter needs to retransmit a part of codewords or all codewords, the transmitter determines that the number of layers used for transmission is the number of layers that need to be occupied for retransmitting the part of codewords or is the number of layers that need to be occupied for retransmitting a part of all the codewords, so as to avoid a case that the number of layers that are used is greater than the number of layers required for retransmitting a codeword, thereby enabling data retransmission to be performed normally.

BRIEF DESCRIPTION OF THE DRAWINGS

FIG. 1 is a flow chart of basic data sending in a 4-antenna MIMO technology;

FIG. 2 is a schematic flow chart of a data retransmission method provided by an embodiment of the present invention;

FIG. 11 is a schematic structural diagram of another transmitter provided by an embodiment of the present invention;

FIG. 12 is a schematic structural diagram of another receiver provided by an embodiment of the present invention; and FIG. 13 is a diagram of an example of process numbers of transport blocks.

DETAILED DESCRIPTION OF ILLUSTRATIVE EMBODIMENTS

Figure 3:
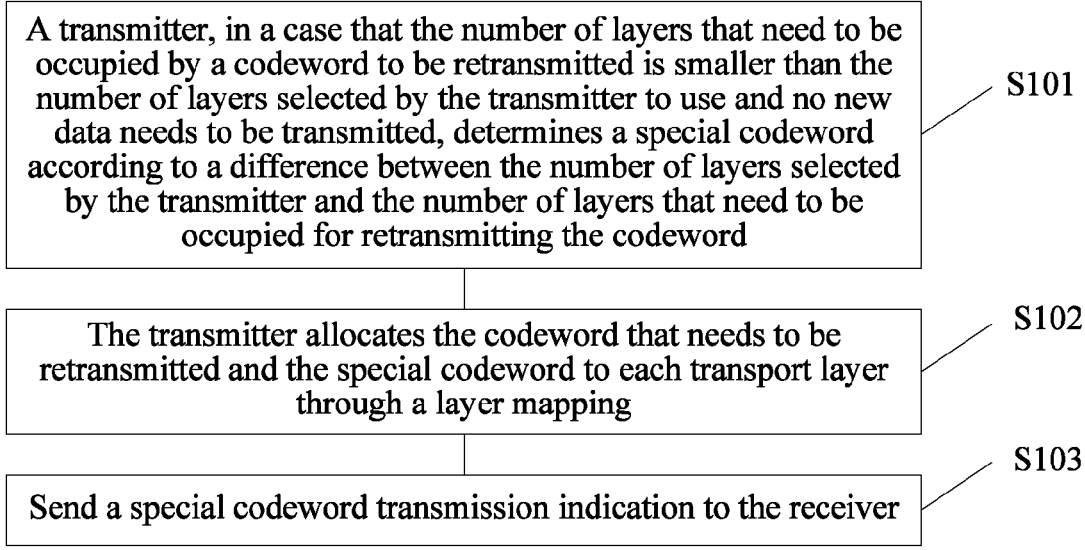
FIG. 3 is a schematic flow chart of another data retransmission method provided by an embodiment of the present invention.

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

It should be noted that, all embodiments of the present invention are applicable to data retransmission in a downlink data transmission process, where a transmitter may be a base station, and a receiver may be a terminal; and are also applicable to data retransmission in an uplink data transmission process, where a transmitter may be a terminal, and a receiver may be a base station.

An embodiment of the present invention provides an MIMO-based data retransmission method, and as shown in FIG. 2, the method may include the following steps.

S101: A transmitter, in a case that the number of layers that need to be occupied by a codeword to be retransmitted is smaller than the number of layers selected by the transmitter to use and no new data needs to be transmitted, determines a special codeword according to a difference between the number of layers selected by the transmitter and the number of layers that need to be occupied for retransmitting the codeword.

In all embodiments of the present invention, the number of layers may also be called as the number of data flows, or the number of flows for short.

The number of transport blocks included in the special codeword is equal to the difference. The special codeword refers to any codeword other than a normal codeword, and a normal codeword refers to a codeword where data that a transmitter actually needs to send to a receiver is located.

Based on an MIMO system, the transmitter may determine, in the following manner, which codewords need to be retransmitted.

The transmitter receives HARQ-ACK (hybrid automatic repeat-request acknowledgement, hybrid automatic repeat request acknowledgement) information fed back by the receiver for a codeword (CW, codeword) transmitted last time and channel state information (CSI, channel state information).

The HARQ-ACK information includes: an ACK or a NACK. If the HARQ-ACK information includes the ACK, it indicates that the codeword corresponding to the HARQ-ACK information is transmitted successfully. If the HARQ-ACK information includes the NACK, it indicates that the codeword corresponding to the HARQ-ACK information is transmitted unsuccessfully, and needs to be retransmitted.

The channel state information includes an RI (Rank Indication rank indication). Further, the channel state information may further include a PCI (Precoding Control Indicator, precoding control indicator) and a CQI (Channel Quality Indicator, channel quality indicator). The RI may also be indicated by an LI (Layer number Indication, layer number indication).

In the foregoing scenario, the case that the number of layers that need to be occupied by the codeword to be retransmitted is smaller than the number of layers selected by the transmitter to use and no new data needs to be transmitted may be a case that HARQ-ACK information fed back for a part of codewords in codewords transmitted last time is the NACK, the number of layers required for retransmitting the part of codewords is smaller than the number of layers selected by the transmitter, and no new data needs to be transmitted.

The transmitter generally selects, according to that the number of layers or the number of TBs corresponding to each codeword that needs to be retransmitted does not change and a sequence of codewords remains unchanged, the number of layers for the codeword that needs to be retransmitted.

Taking a 4*4 MIMO system as an example, a layer mapping is shown in Table 1.

TABLE 1

| The Number of Layers (Rank) | Codeword-to-Layer Mapping |
| --- | --- |
| 1 | $CW_1 \rightarrow$ layer 1 |
| 2 | $CW_1 \rightarrow$ layer 1 |
|   | $CW_2 \rightarrow$ layer 2 |
| 3 | $CW_1 \rightarrow$ layer 1 |
|   | $CW_2 \rightarrow$ layer 2 and layer 3 |
| 4 | $CW_1 \rightarrow$ layer 1 and layer 4 |
|   | $CW_2 \rightarrow$ layer 2 and layer 3 |

According to the layer mapping in Table 1, it can be seen that in the embodiment of the present invention, for the scenario that HARQ-ACK information fed back for a part of codewords in the codewords transmitted last time is the NACK, it may occur that the number of layers used by previous transmission is 2 or 3 or 4, and the part of codewords is $CW_1$ or $CW_2$.

For example, if HARQ-ACK information fed back for the $CW_2$ transmitted last time is the NACK, and HARQ-ACK information fed back for the $CW_1$ is the ACK, it indicates that the $CW_2$ needs to be retransmitted, and the number of layers required in retransmission is 2. In order to make the sequence of the retransmitted codeword remain unchanged, that is, the retransmitted codeword is still $CW_2$ in this transmission, in this case, the number of layers which may be selected by the transmitter is 3 or 4, so that obviously, the number of layers required for retransmitting the $CW_2$ is smaller than the number of selected layers. In this case, if no new data needs to be transmitted, retransmission cannot be performed normally; however, the problem may be solved by using the technical solution of the embodiment of the present invention. The specific solution is as follows.

If the number of layers selected according to the codeword sequence and the layer mapping is 3, a difference between the number of selected layers (being 3) and the number of layers required for retransmitting the $CW_2$ (being 2) is 1, so that the number, determined according to the difference, of transport blocks included in the special codeword in current transmission shall be 1, thereby determining the special codeword.

If the number of layers selected according to the codeword sequence and the layer mapping is 4, a difference between the number of selected layers (being 4) and the number of layers required for retransmitting the $CW_2$ (being 2) is 2, so that the number, determined according to the difference, of transport blocks included in the special codeword in the current transmission shall be 2, thereby determining the special codeword.

For example, if HARQ-ACK information fed back for the $CW_1$ transmitted last time is the NACK, and HARQ-ACK information fed back for the $CW_2$ is the ACK, it indicates that the $CW_1$ needs to be retransmitted, and the number of layers required in retransmission is 2. In order to make the sequence of the retransmitted codeword remain unchanged, that is, the retransmitted codeword is still $CW_1$ in this transmission, in this case, the number of layers which may be selected by the transmitter is 4, so that obviously, the number of layers required for retransmitting the $CW_1$ is smaller than the number of selected layers. In this case, if no new data needs to be transmitted, retransmission cannot be performed normally; however, the problem may be solved by using the technical solution of the embodiment of the present invention. The specific solution is as follows:

A difference between the number of selected layers (being 4) and the number of layers required for retransmitting the $CW_1$ (being 2) is 2, so that the number, determined according to the difference, of transport blocks included in the special codeword in the current transmission shall be 2, thereby determining the special codeword.

For example, if HARQ-ACK information fed back for the $CW_2$ transmitted last time is the NACK and HARQ-ACK information fed back for the $CW_1$ is the ACK, it indicates that the $CW_2$ needs to be retransmitted, and the number of layers required in retransmission is 2. In order to make the sequence of the retransmitted codeword remain unchanged, that is, the retransmitted codeword is still $CW_2$ in this transmission, in this case, the number of layers which may be selected by the transmitter is 3 or 4, so that obviously, the number of layers required for retransmitting the $CW_2$ is smaller than the number of selected layers. In this case, if no new data needs to be transmitted, retransmission cannot be performed normally; however, the problem may be solved by using the technical solution of the embodiment of the present invention. The specific solution is as follows:

If the number of selected layers is 3, a difference between the number of selected layers (being 3) and the number of layers required for retransmitting the $CW_2$ (being 2) is 1, so that the number, determined according to the difference, of transport blocks included in the special codeword in the current transmission shall be 1, thereby determining the special codeword.

If the number of selected layers is 4, a difference between the number of selected layers (being 4) and the number of layers required for retransmitting the $CW_2$ (being 2) is 2, so that the number, determined according to the difference, of transport blocks included in the special codeword in the current transmission shall be 2, thereby determining the special codeword.

For example, if HARQ-ACK information fed back for the $CW_2$ transmitted last time is the NACK, and HARQ-ACK information fed back for the $CW_1$ is the ACK, it indicates that the $CW_2$ needs to be retransmitted, and the number of layers required in retransmission is 1. In order to make the sequence of the retransmitted codeword remain unchanged, that is, the retransmitted codeword is still $CW_2$ in this transmission, in this case, the number of layers which may be selected by the transmitter is 2, so that obviously, the number of layers required for retransmitting the $CW_2$ is smaller than the number of selected layers. In this case, if no new data needs to be transmitted, retransmission cannot be performed normally; however, the problem may be solved by using the technical solution of the embodiment of the present invention. The specific solution is as follows.

A difference between the number of selected layers (being 2) and the number of layers required for retransmitting the $CW_2$ (being 1) is 1, so that the number, determined according to the difference, of transport blocks included in the special codeword in the current transmission shall be 1, thereby determining the special codeword.

Optionally, the special codeword may be a virtual codeword, the virtual codeword is void information, and a level corresponding to void information is 0, which may be, for example, DTX (Discontinuous Transmission, discontinuous transmission) information. The virtual codeword may include one transport block or two transport blocks according to needs.

Optionally, the special codeword is a filling codeword, and the filling codeword is any non-void information, which may be, for example, a repeatedly transmitted codeword with the ACK feedback being received, or a fixed bit sequence, or any other non-void information. It should be noted that information of the filling codeword such as a modulation mode, a transport block length, and a redundancy version number, may be configured randomly. Similarly, the special codeword may also include one transport block or two transport blocks according to needs.

S102: The transmitter allocates the codeword that needs to be retransmitted and the special codeword to each transport layer through a layer mapping.

It can be seen from the special codeword determined in S102 that, the total number of transport blocks included in the codeword that needs to be retransmitted and transport blocks included in the special codeword is consistent with the number of selected retransmission layers, so that the transmitter can perform normal retransmission processing.

Optionally, as shown in FIG. 3, the data retransmission method may further include the following step.

S103: Send a special codeword transmission indication to the receiver.

The special codeword transmission indication is used to identify that current data transmission includes a special codeword. Further, the special codeword transmission indication is further used to identify which codeword is a special codeword, and/or identify which codeword is a retransmitted codeword.

It should be noted that, the transmitter further, according to the prior art, sends data transmission related control information to the receiver, so that the receiver may perform decoding normally. Generally, the data transmission related control information includes: a process number indication (HAPI, HARQ process indication), a modulation indication (MI, Modulation Indication), a rank indication (RI, rank indication; which may also be indicated by an LI, layer number indication), a transport block length indication (TBS, transport block size), and so on.

Optionally, if this method is applied to downlink data transmission, that the transmitter sends the special codeword transmission indication to the receiver in step S103 may include that: the transmitter carries the special codeword transmission indication on an HS-SCCH (High Speed Physical Downlink Shared Control Channel, high speed physical downlink shared control channel), so as to send the special codeword transmission indication to the receiver.

For how the transmitter carries the special codeword transmission indication on the HS-SCCH, any one of the following two manners may be adopted.

In a first manner, a bit is added to a packet including the data transmission related control information, and is used to identify the special codeword transmission indication, and the packet is carried on the HS-SCCH.

For a format of the packet including the data transmission related control information, reference may be made to Table 2.

TABLE 2

| First part | Second part | |
|---|---|---|
| | Codeword including 1 transport block | Codeword including 2 transport blocks |
| CCS (7 bits), MI + RI (5 bits), PCI (4 bits) | TBS (6 bits) HAPI (4 bits) RV (2 bits) | TBS (6 bits × 2) HAPI (4 bits) RV (2 bits × 2) |

In the table, CCS is a channelization-code-set, MI represents modulation information, HAPI represents HARQ process information (Hybrid-ARQ process information), and RV is a redundancy and constellation version.

In this manner, a bit may be added to the first part and/or the second part in the packet shown by Table 2, so as to identify the special codeword transmission indication.

In a second manner, at least one control information field in a packet including the data transmission related control information is set to a specific value, so as to identify the special codeword transmission indication, and the packet is carried on the HS-SCCH. The specific value may be a specific bit sequence, that is, may be a bit sequence that is not used in a normal case. For example, it is assumed that 0-29 are used to indicate modulation information in a normal case, then, 30 or 31 is the specific value.

The control information field refers to a corresponding bit sequence that is in the packet and used to transmit an indication. For example, 7 bits occupied by the CCS may be called a CCS field.

For example, the specific value is set in one or more fields among the CCS field, a TBS field, and so on.

Through steps S101-S102, or further through S103, the transmitter can perform data retransmission normally in a case that the number of layers which shall be used is greater than the number of layers required for retransmitting a codeword and no new data needs to be transmitted. The following describes in detail two applicable solutions regarding how a receiver correctly identifies a codeword.

Solution 1: For a case that a special codeword transmission indication is only used to identify that the current data transmission includes a special codeword, but does not identify which codeword is the special codeword.

Figure 4:
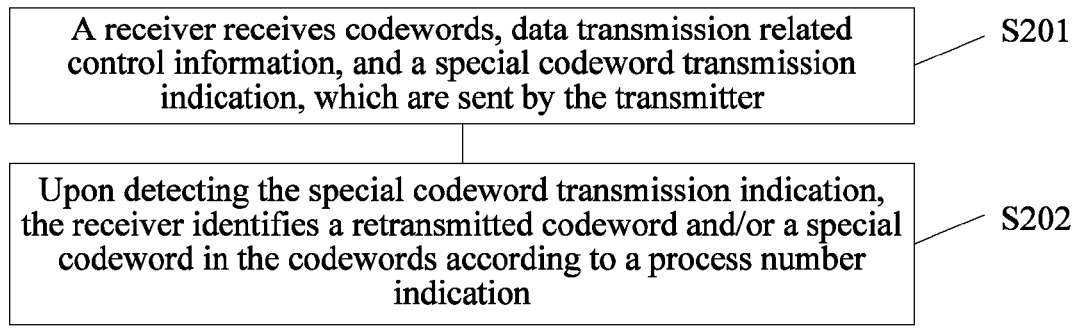
FIG. 4 is a schematic flow chart of another data retransmission method provided by an embodiment of the present invention.

As shown in FIG. 4, a receiver may perform the following steps.

S201: A receiver receives codewords, data transmission related control information, and a special codeword transmission indication, which are sent by the transmitter.

The data transmission related control information includes a process number indication, and definitely may also, by referring to the foregoing description, include other information such as a modulation indication. The codewords include a retransmitted codeword and a special codeword. The special codeword transmission indication is used to identify that the current data transmission includes a special codeword.

The special codeword transmission indication does not indicate which codeword is the special codeword, so that the receiver needs to identify the special codeword and the retransmitted codeword respectively through S202, so as to decode the retransmitted codeword.

S202: Upon detecting the special codeword transmission indication, the receiver identifies the retransmitted codeword and/or the special codeword in the codewords according to the process number indication.

This step may include that: upon detecting the special codeword transmission indication, the receiver identifies, according to whether buffered data corresponding to a process indicated by the process number indication or an associated process of the process is correctly decoded, whether a transport block corresponding to the indicated process or the associated process belongs to the special codeword or the retransmitted codeword.

In the embodiment of the present invention, an associated process of a process I refers to a process, a difference between a process number of which and that of the process I is a first fixed value. Specifically, if a process number in the process number indication is k, the associated process of the process refers to a process having the process number being $(k+N_1) \bmod(N_2)$. $N_1$ is the first fixed value, $N_2$ is a second fixed value, and the second fixed value is twice the first fixed value.

Optionally, this step is specifically that: upon detecting the special codeword transmission indication, the receiver determines whether the buffered data corresponding to the process indicated by the process number indication is correctly decoded; if not, that is, a transport block corresponding to this process is not correctly decoded in previous data transmission, data retransmission is performed definitely on this process in the current transmission, so as to identify that a transport block corresponding to the indicated process in the current data transmission belongs to the retransmitted codeword, and transport blocks corresponding to another process belong to the special codeword; or, if yes, that is, the process is correctly decoded in the previous data transmission, it is identified that a transport block corresponding to the indicated process belongs to the special codeword, and transport blocks corresponding to another process belong to the retransmitted codeword.

Optionally, this step is specifically that: the receiver determines whether the buffered data corresponding to the associated process of the process indicated by the process number indication is correctly decoded; if the buffered data is not correctly decoded, that is, a transport block corresponding to the associated process is not correctly decoded in previous data transmission, data retransmission is performed definitely on the associated process in the current transmission, so as to identify that a transport block corresponding to the associated process in the current data transmission belongs to the retransmitted codeword, and transport blocks corresponding to another process belong to the special codeword; or, if the buffered data is correctly decoded, that is, the associated process is correctly decoded in the previous data transmission, it is identified that a transport block corresponding to the associated process belongs to the special codeword, and transport blocks corresponding to another process belong to the codeword that needs to be retransmitted.

In this way, through steps 201 and 202, the receiver may normally receive data retransmitted by the transmitter, and in a case that which codeword is a special codeword is unknown, identify which one is a special codeword and which one is a retransmitted codeword.

Solution 2: For a case that a special codeword transmission indication is not only used to identify that the current data transmission includes a special codeword, but also used to identify which codeword is a special codeword and/or identify which a codeword is a retransmitted codeword.

Figure 5:
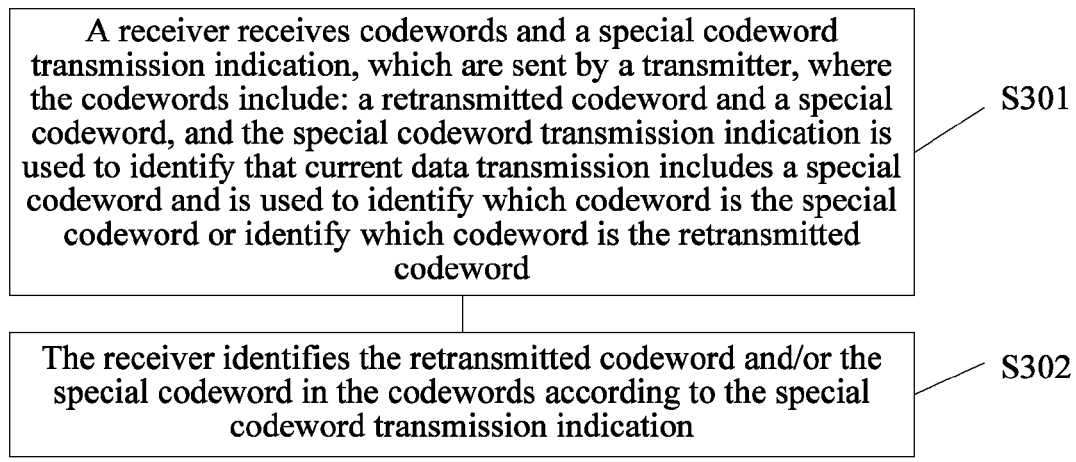
FIG. 5 is a schematic flow chart of another data retransmission method provided by an embodiment of the present invention.

As shown in FIG. 5, a receiver may perform the following steps.

S301: A receiver receives codewords and a special codeword transmission indication, which are sent by the transmitter, where the codewords include: a retransmitted codeword and a special codeword, and the special codeword transmission indication is used to identify that current data transmission includes a special codeword, and is used to identify which codeword is the special codeword or identify which codeword is the retransmitted codeword.

S302: The receiver identifies the retransmitted codeword and/or the special codeword in the codewords according to the special codeword transmission indication.

This step includes that: if the special codeword transmission indication is used to identify which codeword is the special codeword, the receiver can identify that the codeword in the special codeword transmission indication is the special codeword, and the other codeword is the retransmitted codeword.

If the special codeword transmission indication is used to identify which codeword is the retransmitted codeword, the receiver can identify that the codeword in the special codeword transmission indication is the retransmitted codeword, and the other codeword is the special codeword.

If the special codeword transmission indication is used to identify which codeword is the special codeword and identify which codeword is the retransmitted codeword, the receiver can identify the special codeword and the retransmitted codeword according to the special codeword transmission indication.

In this way, through steps 301 and 302, the receiver may normally receive data retransmitted by the transmitter, and identify which one is a special codeword and which one is a retransmitted codeword according to the special codeword transmission indication. Further, decoding may be performed on the retransmitted codeword that is identified.

The embodiment of the present invention provides an MIMO-based data retransmission method. When a transmitter needs to retransmit data, and in a case that the number of layers required by the data to be retransmitted is smaller than the number of layers selected by the transmitter and no new data needs to be transmitted, a special codeword is transmitted, so that data retransmission is performed normally in the specific case.

An embodiment of the present invention further provides an apparatus corresponding to the data retransmission method.

Figure 6:
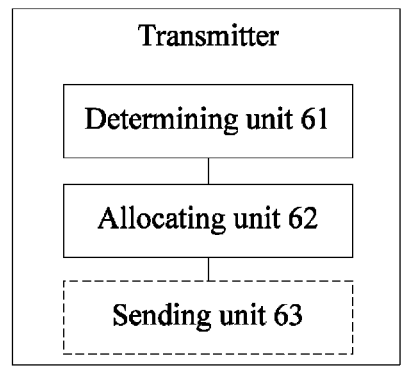
FIG. 6 is a schematic structural diagram of a transmitter provided by an embodiment of the present invention.

As shown in FIG. 6, an embodiment of the present invention provides a transmitter. A determining unit 61 is configured to, in a case that the number of layers that need to be occupied by a codeword to be retransmitted is smaller than the number of layers selected by the transmitter to use and no new data needs to be transmitted, determine a special codeword according to a difference between the number of layers selected by the transmitter and the number of layers that need to be occupied for retransmitting the codeword, where the number of transport blocks included in the special codeword is equal to the difference. The special codeword is a virtual codeword, and the virtual codeword is void information; or, the special codeword is a filling codeword, and the filling codeword is any non-void information. An allocating unit 62 is configured to allocate the codeword that needs to be retransmitted and the special codeword to each transport layer through a layer mapping.

Further, the transmitter may further include a sending unit 63, configured to send a special codeword transmission indication to the receiver, where the special codeword transmission indication is used to identify that current data transmission includes a special codeword.

If the transmitter is a base station, the sending unit 63 may be specifically configured to carry the special codeword transmission indication on an HS-SCCH, so as to send the special codeword transmission indication to the receiver (a terminal).

Optionally, the sending unit may be configured to add, to a packet including data transmission related control information, a bit, to identify the special codeword transmission indication, and carry the packet on the HS-SCCH; or, set at least one control information field in a packet including data transmission related control information to a specific value, to identify the special codeword transmission indication, and carry the packet on the HS-SCCH.

Optionally, the special codeword transmission indication is further used to identify which codeword is a special codeword or identify which codeword is the retransmitted codeword.

Figure 7:
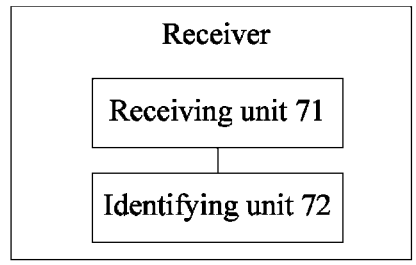
FIG. 7 is a schematic structural diagram of a receiver provided by an embodiment of the present invention.

As shown in FIG. 7, an embodiment of the present invention further provides a receiver, including a receiving unit 71, configured to receive codewords, data transmission related control information, and a special codeword transmission indication, which are sent by the transmitter, where the data transmission related control information includes a process number indication; the codewords include a retransmitted codeword and a special codeword, and the special codeword transmission indication is used to identify that current data transmission includes a special codeword; and an identifying unit 72, configured to, upon detecting the special codeword transmission indication, identify the retransmitted codeword and/or the special codeword in the codewords according to the process number indication.

The identifying unit 72 may be configured to, upon detecting the special codeword transmission indication, identify, according to whether buffered data corresponding to a process indicated by the process number indication or an associated process of the process is correctly decoded, whether a transport block corresponding to the indicated process or the associated process belongs to the special codeword or the retransmitted codeword.

The identifying unit 72 may specifically be configured to determine whether the buffered data corresponding to the process indicated by the process number indication or the associated process of the process is correctly decoded; if the buffered data is not correctly decoded, identify that the transport block corresponding to the indicated process or the associated process in the current data transmission belongs to the retransmitted codeword; or, if the buffered data is correctly decoded, identify that the transport block corresponding to the indicated process or the associated process in the current data transmission belongs to the special codeword.

Figure 8:
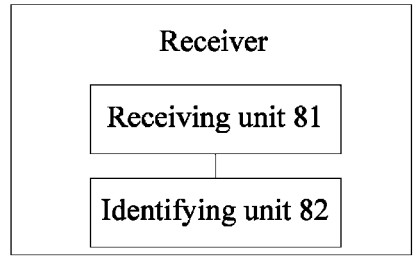
FIG. 8 is a schematic structural diagram of another receiver provided by an embodiment of the present invention.

As shown in FIG. 8, an embodiment of the present invention further provides a receiver, including: a receiving unit 81, configured to receive codewords and a special codeword transmission indication, which are sent by the transmitter, where the codewords include: a retransmitted codeword and a special codeword, and the special codeword transmission indication is used to identify that current data transmission includes a special codeword, and is used to identify which codeword is the special codeword or identify which codeword is the retransmitted codeword; and an identifying unit 82, configured to identify the retransmitted codeword and/or the special codeword in the codewords according to the special codeword transmission indication.

An embodiment of the present invention further provides a transmitter, including: a processor, configured to, in a case that the number of layers that need to be occupied by a codeword to be retransmitted is smaller than the number of layers selected by the transmitter to use and no new data needs to be transmitted, determine a special codeword according to a difference between the number of layers selected by the transmitter and the number of layers that need to be occupied for retransmitting the codeword, where the number of transport blocks included in the special codeword is equal to the difference; further configured to allocate the codeword that needs to be retransmitted and the special codeword to each transport layer through a layer mapping.

The special codeword is a virtual codeword, and the virtual codeword is void information; or, the special codeword is a filling codeword, and the filling codeword is any non-void information.

The transmitting device further includes: a sending component, configured to send the codeword to a receiving device.

Further, the sending component is further configured to send a special codeword transmission indication to the receiver, where the special codeword transmission indication is used to identify that current data transmission includes a special codeword.

If the transmitter is a base station, the sending component is configured to carry the special codeword transmission indication on an HS-SCCH, so as to send the special codeword transmission indication to the receiver (a terminal).

Optionally, the sending component may be configured to add, to a packet including data transmission related control information, a bit, to identify the special codeword transmission indication, and carry the packet on the HS-SCCH; or, set at least one control information field in a packet including data transmission related control information to a specific value, to identify the special codeword transmission indication, and carry the packet on the HS-SCCH.

Optionally, the special codeword transmission indication is further used to identify which codeword is a special codeword or identify which codeword is the retransmitted codeword.

An embodiment of the present invention further provides a receiver, including: a receiving component, configured to receive codewords, data transmission related control information, and a special codeword transmission indication, which are sent by the transmitter, where the data transmission related control information includes a process number indication; the codewords include a retransmitted codeword and a special codeword, and the special codeword transmission indication is used to identify that current data transmission includes a special codeword; and a processor, configured to, upon detecting the special codeword transmission indication, identify the retransmitted codeword and/or the special codeword in the codewords according to the process number indication.

The processor may be configured to, upon detecting the special codeword transmission indication, identify, according to whether buffered data corresponding to a process indicated by the process number indication or an associated process of the process is correctly decoded, whether a transport block corresponding to the indicated process or the associated process belongs to the special codeword or the retransmitted codeword.

The processor may specifically be configured to determine whether the buffered data corresponding to the process indicated by the process number indication or the associated process of the process is correctly decoded; if the buffered data is not correctly decoded, identify that the transport block corresponding to the indicated process or the associated process in the current data transmission belongs to the retransmitted codeword; or, if the buffered data is correctly decoded, identify that the transport block corresponding to the indicated process or the associated process in the current data transmission belongs to the special codeword.

An embodiment of the present invention further provides a receiver, including: a receiving component, configured to receive codewords and a special codeword transmission indication, which are sent by the transmitter, where the codewords include: a retransmitted codeword and a special codeword, and the special codeword transmission indication is used to identify that current data transmission includes a special codeword, and is used to identify which codeword is the special codeword or identify which codeword is the retransmitted codeword; and a processor, configured to identify the retransmitted codeword and/or the special codeword in the codewords according to the special codeword transmission indication.

An embodiment of the present invention further provides a data retransmission system, including a transmitter and a receiver. The transmitter is configured to, in a case that the number of layers that need to be occupied by a codeword to be retransmitted is smaller than the number of layers selected by the transmitter to use and no new data needs to be transmitted, determine a special codeword according to a difference between the number of layers selected by the transmitter and the number of layers that need to be occupied for retransmitting the codeword, where the number of transport blocks included in the special codeword is equal to the difference; and allocate the codeword that needs to be retransmitted and the special codeword to each transport layer through a layer mapping.

Further, the transmitter is further configured to send a special codeword transmission indication to the receiver, where the special codeword transmission indication is used to identify that current data transmission includes a special codeword.

The receiver is configured to receive codewords, data transmission related control information, and the special codeword transmission indication, which are sent by the transmitter, where the data transmission related control information includes a process number indication; the codewords include the retransmitted codeword and the special codeword, and the special codeword transmission indication is used to identify that the current data transmission includes a special codeword; and, upon detecting the special codeword transmission indication, identify the retransmitted codeword and/or the special codeword in the codewords according to the process number indication.

The receiver may specifically be configured to, upon detecting the special codeword transmission indication, identify, according to whether buffered data corresponding to a process indicated by the process number indication or an associated process of the process is correctly decoded, whether a transport block corresponding to the indicated process or the associated process belongs to the special codeword or the retransmitted codeword. Further, the receiver is configured to determine whether the buffered data corresponding to the process indicated by the process number indication or the associated process of the process is correctly decoded; if the buffered data is not correctly decoded, identify that the transport block corresponding to the indicated process or the associated process in the current data transmission belongs to the retransmitted codeword; if the buffered data is correctly decoded, identify that the transport block corresponding to the indicated process or the associated process in the current data transmission belongs to the special codeword.

Alternatively, further, the transmitter is further configured to send a special codeword transmission indication to the receiver, where the special codeword transmission indication is used to identify that the current data transmission includes a special codeword.

The receiver is configured to receive codewords and the special codeword transmission indication, which are sent by the transmitter, where the codewords include: the retransmitted codeword and the special codeword, and the special codeword transmission indication is used to identify that the current data transmission includes a special codeword, and is used to identify which codeword is the special codeword or identify which codeword is the retransmitted codeword; and identify the retransmitted codeword and/or the special codeword in the codewords according to the special codeword transmission indication.

The embodiments of the present invention provide an MIMO-based data retransmission apparatus and system. When a transmitter needs to retransmit data, and in a case that the number of layers required by the data to be retransmitted is smaller than the number of layers selected by the transmitter and no new data needs to be transmitted, a special codeword is transmitted, so that data retransmission is performed normally in the specific case.

Figure 9:
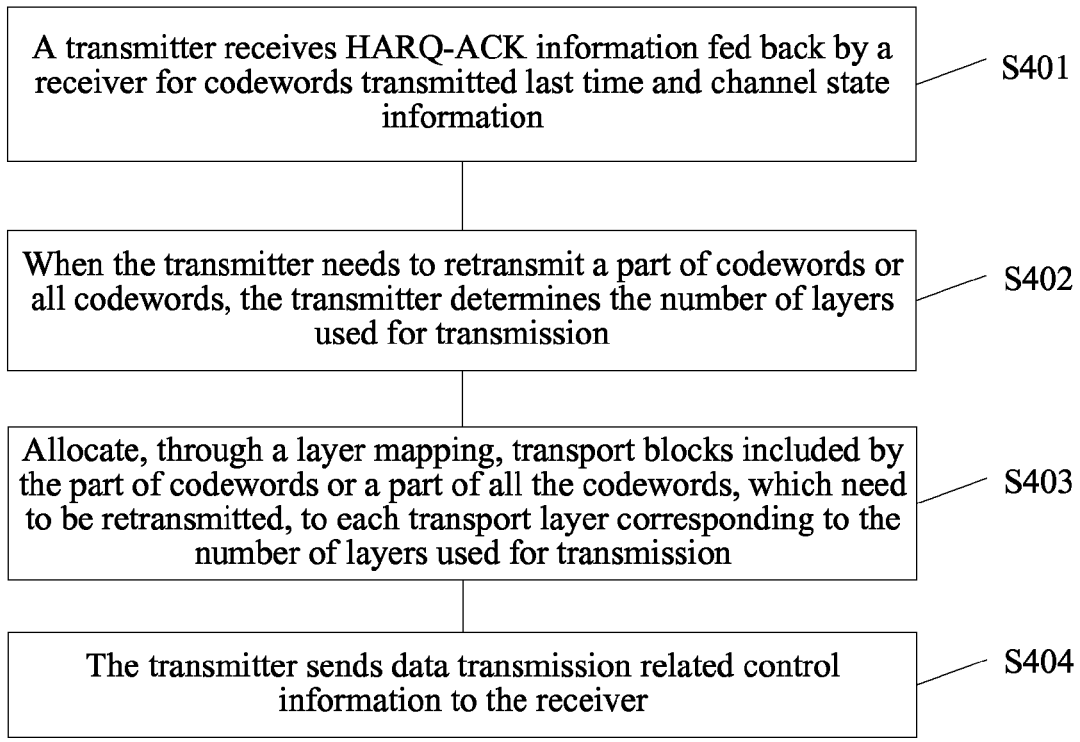
FIG. 9 is a schematic flow chart of another data retransmission method provided by an embodiment of the present invention.

An embodiment of the present invention further provides a data retransmission method, and as shown in FIG. 9, the method includes the following steps.

S401: A transmitter receives HARQ-ACK information fed back by a receiver for codewords transmitted last time and channel state information.

The channel state information includes an RI. Definitely, the channel state information may further include a PCI, a CQI, and so on.

If the HARQ-ACK information fed back for a part of codewords or all codewords in the codewords transmitted last time is NACK, enter step S402. The part of codewords may be understood as that: if the total number of codewords transmitted last time is 2, one of the 2 codewords is the part of codewords.

S402: When the transmitter needs to retransmit a part of codewords or all codewords, the transmitter determines the number of layers used for transmission.

This step includes that: when the transmitter needs to retransmit a part of codewords or all the codewords, the transmitter determines that the number of layers used for transmission is the number of layers that need to be occupied for retransmitting the part of codewords or is the number of layers that need to be occupied for retransmitting a part of all the codewords.

Specifically, if the transmitter needs to retransmit a part of codewords, the transmitter may determine that the number of layers used in current transmission is the number of layers that need to be occupied for retransmitting the part of codewords. For example, if the part of codewords that need to be retransmitted include 2 transport blocks, the number of layers that need to be occupied for retransmitting the part of codewords is 2, and in this case, the transmitter determines that the number of layers used in the current transmission is 2.

If the transmitter needs to retransmit all the codewords, the transmitter may determine that the number of layers used in the current transmission is the number of layers that need to be occupied for retransmitting a part of all the codewords, or the transmitter may further determine that the number of layers used in the current transmission is the number of layers that need to be occupied for retransmitting all the codewords. For example, if the total number of all the codewords that need to be retransmitted is two, and the two codewords include 1 transport block and 2 transport blocks respectively, the transmitter may determine that the number of layers used in the current transmission is the number, being 1, of layers that need to be occupied by one of the two codewords, or the number, being 2, of layers that need to be occupied by the other of the two codewords, or the number, being 3, of layers that need to be occupied for retransmitting all the codewords.

S403: Allocate, through a layer mapping, transport blocks included in the part of codewords or a part of all the codewords, which need to be retransmitted, to each transport layer corresponding to the number of layers used for transmission.

For example, if a part of codewords that need to be retransmitted include 2 transport blocks, the 2 transport blocks are transmitted by using transport layers (the layer 1 and the layer 2) corresponding to the RI being 2 in the layer mapping shown by Table 1.

For example, if a part of all the codewords that need to be retransmitted include 2 transport blocks, the 2 transport blocks are transmitted by using transport layers (the layer 1 and the layer 2) corresponding to the RI being 2 in the layer mapping shown by Table 1.

For example, if a part of all the codewords that need to be retransmitted include 1 transport block, the transport block is transmitted by using a transport layer (the layer 1) corresponding to the RI being 1 in the layer mapping shown by Table 1.

Preferably, step S403 includes that: a transport block included in the part of codewords or a part of all the codewords, which need to be retransmitted, is mapped into a reprocessed codeword through the number of layers used for transmission and a transport-block-to-codeword mapping, and the reprocessed codeword is allocated, through the layer mapping, to each transport layer corresponding to the number of layers used for transmission. The layer mapping is shown by Table 1, and the transport-block-to-codeword mapping may be as what is shown by Table 2.

In order to clearly describe the transport-block-to-codeword mapping, a 4*4MIMO is taken as an example in the embodiment of the present invention. When the number of layers is 1, 1 codeword is used to perform data transmission, and the codeword is identified by using $CW_1$; when the number of layers is 2 or 3 or 4, 2 codewords are used to perform data transmission, and the 2 codewords are identified by using $CW_1$ and $CW_2$ respectively. Each codeword includes at most 2 transport blocks.

For the system, in each TTI (Transmission Time Interval, transmission time interval), at most 4 transport blocks may be sent, which are identified by using $TB_1$, $TB_2$, $TB_3$, and $TB_4$, respectively. To clearly describe the solution provided by the present invention, the $TB_1$ and the $TB_2$ have different process numbers, and a difference between the different process numbers is a first fixed value; the $TB_1$ and the $TB_3$ have the same process number, and $TB_2$ and $TB_4$ have the same process number. The process number of the $TB_1$ is smaller than the first fixed value, the process number of the $TB_2$ is greater than or equal to the first fixed value and is smaller than a second fixed value, and the second fixed value is twice the first fixed value. The first fixed value is identified by using $N_1$, and the second fixed value is identified by using $N_2$. The process numbers of the transport blocks shown in FIG. 13 are only used as an example.

In all embodiments of the present invention, a given relationship is understood as follows: the $TB_1$ and $TB_3$, and the $TB_2$ and $TB_4$ may further have other given relationships. For example, a difference between the process numbers of the $TB_1$ and the $TB_3$ is the second fixed value, and a difference between the process numbers of the $TB_2$ and the $TB_4$ is the second fixed value. For another example, the difference between the process numbers of the $TB_1$ and the $TB_3$ is a third fixed value, and the difference between the process numbers of the $TB_2$ and the $TB_4$ is the first fixed value, where the third fixed value is three times the first fixed value, and is identified by using $N_3$.

In the embodiment of the present invention, the process number of the $TB_1$ is identified by using k, and $0 \leq k < N_1$; the difference between the process numbers of the $TB_2$ and the $TB_1$ is $N_1$, and it is assumed that the process number of the $TB_2$ is greater than the process number of the $TB_1$, so that the process number of the $TB_2$ is $k+N_1$, a range of the process number of the $TB_2$ is $N_1 \leq k+N_1 < N_2$; the $TB_3$ and the $TB_1$ have the same process number being k; and the process number of the $TB_4$ is $k+N_1$. Further, in the embodiment of the present invention, a specific codeword refers to a codeword to which a transport block corresponding to a process number indication belongs; a non-specific codeword refers to a codeword other than a specific codeword.

The process numbers of the $TB_1$, $TB_2$, $TB_3$, and $TB_4$ may also be k, $k+N_1$, $k+N_2$, and $(k+N_1)+N_2$, respectively. Optionally, the process numbers of the $TB_1$, $TB_2$, $TB_3$, and $TB_4$ may also be k, $k+N_1$, $k+N_3$, and $(k+N_1)+N_1$ respectively.

The transport-block-to-codeword mapping includes that: a codeword corresponds to transport blocks having a same process number or transport blocks having process numbers between which a difference is in a given relationship.

Further optionally, the transport-block-to-codeword mapping further includes that: when the number of layers used for transmission is 3 or 4, a process number of a transport block corresponding to a specific codeword and a process number of a transport block corresponding to a non-specific codeword are different, and a difference between the two process numbers is the first fixed value.

It can be seen from Table 1 that, the transport-block-to-codeword mapping further includes that: when the number of layers used for transmission is 3, a specific codeword includes a transport block, and a non-specific codeword includes two transport blocks.

Further optionally, the transport-block-to-codeword mapping further includes that: when the number of layers used for transmission is 2, if two transport blocks are transmitted initially, or if the RI is 2 during previous transmission and the two transport blocks both need to be retransmitted and a difference between process numbers of the two transport blocks is the first fixed value, the process number of the transport block corresponding to the specific codeword and the process number of the transport block corresponding to the non-specific codeword are different, and a difference between the two process numbers is the first fixed value.

In this case, for the example, the transport-block-to-codeword mapping is shown in Table 2.

TABLE 2

| RI, the number of transport layers | Transport-block-to-codeword mapping | Indicated process number |
|---|---|---|
| 1 | $TB_1 \rightarrow CW_1$ or $TB_2 \rightarrow CW_1$ | Process number of TB corresponding to $CW_1$ |
| 2 | $\begin{cases} TB^1 \rightarrow CW^1 \\ TB_2 \rightarrow CW_2 \end{cases}$ $\begin{cases} TB^2 \rightarrow CW^1 \\ TB_1 \rightarrow CW_2 \end{cases}$ or $\begin{cases} TB^1 \rightarrow CW^1 \\ TB_3 \rightarrow CW_2 \end{cases}$ $\begin{cases} TB^2 \rightarrow CW^1 \\ TB_4 \rightarrow CW_2 \end{cases}$ | Process number of TB corresponding to $CW_1$ |
| 3 | $\begin{cases} TB^1 \rightarrow CW^1 \\ TB_2 + TB_4 \rightarrow CW_2 \end{cases}$ or $\begin{cases} TB^2 \rightarrow CW^1 \\ TB_1 + TB_3 \rightarrow CW_2 \end{cases}$ | Process number of TB corresponding to $CW_1$ |
| 4 | $\begin{cases} TB^1 + TB^3 \rightarrow CW^1 \\ TB_2 + TB_4 \rightarrow CW_2 \end{cases}$ or $\begin{cases} TB^2 + TB^4 \rightarrow CW^1 \\ TB_1 + TB_3 \rightarrow CW_2 \end{cases}$ | Process number of first TB corresponding to $CW_1$ |

The indicated process number in Table 2 refers to a process number that needs to be written into a process number indication during data transmission performed according to the transport-block-to-codeword mapping. In the present invention, the specific codeword is, for example, the $CW_1$, and therefore the non-specific codeword is the $CW_2$; definitely, the specific codeword may also be the $CW_2$, and therefore the non-specific codeword is the $CW_1$.

In Table 2, for the case that the RI is 2, a mapping between the transport block and the codeword is:

$$\begin{cases} TB_1 \rightarrow CW_1 \\ TB_2 \rightarrow CW_2 \end{cases} \text{or} \begin{cases} TB_2 \rightarrow CW_1 \\ TB_1 \rightarrow CW_2 \end{cases} \text{or} \begin{cases} TB_1 \rightarrow CW_1 \\ TB_3 \rightarrow CW_2 \end{cases} \text{or} \begin{cases} TB_2 \rightarrow CW_1 \\ TB_4 \rightarrow CW_2 \end{cases}$$

where $$\begin{cases} TB_1 \rightarrow CW_1 \\ TB_2 \rightarrow CW_2 \end{cases} \text{or} \begin{cases} TB_2 \rightarrow CW_1 \\ TB_1 \rightarrow CW_2 \end{cases}$$

is obviously for a case that when the number of layers is 2, two transport blocks are transmitted initially, or the RI is 2 uring previous transmission and two transport blocks both need to be retransmitted and a difference between process numbers of the two transport blocks is the first fixed value; and therefore $$\begin{cases} TB_1 \rightarrow CW_1 \\ TB_3 \rightarrow CW_2 \end{cases} \text{or} \begin{cases} TB_2 \rightarrow CW_1 \\ TB_4 \rightarrow CW_2 \end{cases}$$

is for a case that the RI is greater than 2 during previous transmission and a codeword including two transport blocks needs to be retransmitted.

It should be noted that, the transmitter may complete normal retransmission of data according to step S401 to step S403, and further, the transmitter further needs to ensure that the receiver can perform normal decoding on received data, so that step S404 further needs to be performed. It should be noted that the numbers do not indicate a sequential relationship between the steps, and for example, S403 and S404 may be performed at the same time.

S404: The transmitter sends data transmission related control information to the receiver.

The data transmission related control information includes an RI and a process number indication. The RI indicates the number of layers used in the current transmission, the process number indication is used to identify a process number of a transport block of the transmitter in the current transmission, and a codeword, to which the transport block belongs, is called a specific codeword in the embodiment of the present invention.

Through step S404, the receiver can identify, according to the RI, the process number indication, and the transport-block-to-codeword mapping, a transport block combination corresponding to the retransmitted codeword that is received.

Further optionally, if the number of layers used for transmission is 2, and the current transmission is to retransmit a part of codewords in previous transmission in which RI>2, at least one control information field of a packet including the data transmission related control information is set to a special indication, and the special indication is used to, when the number of layers used for transmission is 2, identify that the process numbers of the transport block in the non-specific codeword and the transport block in the specific codeword are the same or in a given relationship (for example, a difference between the process numbers is the second fixed value). Optionally, the special indication may be a fixed sequence.

For example, if the number of layers used for transmission is 2, and the current transmission is to retransmit a part of codewords in the previous transmission in which RI>2, the special indication may be set in one or more fields among a CCS field, a TBS field, an MI field and so on. For example, the special indication may be a fixed sequence '111111'.

Optionally, a bit is added to a packet including data transmission related control information, and the bit is used to transmit the special indication in the case that the number of layers used for transmission is 2 and the current transmission is to retransmit a part of codewords in the previous transmission in which RI>2.

In this way, the receiver can determine, by detecting whether the special indication is set in the packet of the data transmission related control information, the transport block combination corresponding to the codeword received by the receiver.

The foregoing method is described in the following through examples. For ease of description, in the following examples, the process number of the $TB_1$ is identified by using $k(0 \leq k < N_1)$, the process number of the $TB_2$ is identified by using $k+N_1$ ($N_1 < k+N_1 < N_2$), the process number of the $TB_3$ and the process number of the $TB_1$ are the same, and the process number of the $TB_4$ and the process number of the $TB_2$ are the same. The specific codeword is the $CW_1$.

A first example to a six example are examples where a part of codewords need to be retransmitted, and a seventh example to an eighth example are examples where all codewords need to be retransmitted.

In the first example, the following steps are included.

(1) The transmitter uses the number of layers, being 4, during previous transmission, that is, two TBs are transmitted by using the $CW_1$ and the $CW_2$, respectively; for example, the $CW_1$ transmits the $TB_1+TB_3$, the process number corresponding to the $TB_1$ is k, the $CW_2$ transmits the $TB_2+TB_4$, and the process number corresponding to the $TB_2$ is $k+N_1$.

(2) The transmitter receives a feedback, being the ACK, fed back by the receiver for the $CW_1$ transmitted last time and a feedback, being the NACK, for the $CW_2$.

(3) The transmitter determines, according to the feedbacks of the receiver, that 2 TBs (the $TB_2$ and the $TB_4$) in the $CW_2$ need to be retransmitted.

(4) 2 TBs need to be retransmitted, that is to say, the number of layers that need to be occupied for retransmitting the $CW_2$ is 2, so that the transmitter determines that the number of layers used in current transmission is 2.

(5) The 2 TBs that need to be retransmitted are mapped according to the transport-block-to-codeword mapping corresponding to the RI being 2 shown by Table 2, to obtain reprocessed codewords $CW_1$ and $CW_2$, that is, the $CW_1$ transmits the $TB_2$, the corresponding process number is still $k+N_1$, the $CW_2$ transmits the $TB_4$, the corresponding process number is still $k+N_1$, and the reprocessed codewords $CW_1$ and $CW_2$ are allocated, according to the layer mapping of the RI=2 in Table 1, to each transport layer for transmission.

(6) The transmitter sends data transmission related control information to the receiver, where the control information includes that: the RI of the current transmission is 2 and the process number indication is the process number being $k+N_1$ of the $TB_2$ in the $CW_1$ of the current transmission.

In the second example, the following steps are included.

(1) The transmitter uses the number of layers, being 4, during previous transmission, that is, two TBs are transmitted by using the $CW_1$ and the $CW_2$, respectively; for example, the $CW_1$ transmits the $TB_1+TB_3$, the process number corresponding to the $TB_1$ is k, the $CW_2$ transmits the $TB_2+TB_4$, and the process number corresponding to the $TB_2$ is $k+N_1$.

(2) The transmitter receives a feedback, being the NACK, fed back by the receiver for the $CW_1$ transmitted last time and a feedback, being the ACK, for the $CW_2$.

(3) The transmitter determines, according to the feedbacks of the receiver, that 2 TBs (the $TB_1$ and the $TB_3$) in the $CW_1$ need to be retransmitted.

(4) 2 TBs need to be retransmitted, that is to say, the number of layers that need to be occupied for retransmitting the $CW_1$ is 2, so that the transmitter determines that the number of layers used in current transmission is 2.

(5) The 2 TBs that need to be retransmitted are mapped according to the transport-block-to-codeword mapping corresponding to the RI being 2 shown by Table 2, to obtain reprocessed codewords $CW_1$ and $CW_2$, that is, the $CW_1$ transmits the $TB_1$, the corresponding process number is still k, the $CW_2$ transmits the $TB_3$, the corresponding process number is still k, and the reprocessed codewords $CW_1$ and $CW_2$ are allocated, according to the layer mapping of the RI=2 in Table 1, to each transport layer for transmission.

(6) The transmitter sends data transmission related control information to the receiver, where the control information includes that: the RI of the current transmission is 2 and the process number indication is the process number being k of the $TB_1$ in the $CW_1$ of the current transmission.

In the third example, the following steps are included.

(1) The transmitter uses the number of layers, being 3, during previous transmission, that is, transmits 1 TB by using the $CW_1$ and transmits 2 TBs by using the $CW_2$; for example, the $CW_1$ transmits the $TB_1$, the process number corresponding to the $TB_1$ is k, the $CW_2$ transmits the $TB_2+TB_4$, and the process number corresponding to the $TB_2$ is $k+N_1$.

(2) The transmitter receives a feedback, being the ACK, fed back by the receiver for the $CW_1$ transmitted last time and a feedback, being the NACK, for the $CW_2$.

(3) The transmitter determines, according to the feedbacks of the receiver, that 2 TBs (the $TB_2$ and the $TB_4$) included in the $CW_2$ need to be retransmitted.

(4) 2 TBs need to be retransmitted, that is to say, the number of layers that need to be occupied for retransmitting the $CW_2$ is 2, so that the transmitter determines that the number of layers used in current transmission is 2.

(5) The 2 TBs that need to be retransmitted are mapped according to the transport-block-to-codeword mapping corresponding to the RI being 2 shown by Table 2, to obtain reprocessed codewords $CW_1$ and $CW_2$, that is, the $CW_1$ transmits the $TB_2$, the corresponding process number is still $k+N_1$, the $CW_2$ transmits the $TB_4$, the corresponding process number is still $k+N_1$, and the reprocessed codewords $CW_1$ and $CW_2$ are allocated, according to the layer mapping of the RI=2 in Table 1, to each transport layer for transmission.

(6) The transmitter sends data transmission related control information to the receiver, where the control information includes that: the RI of the current transmission is 2 and the process number indication is the process number being $k+N_1$ of the $TB_2$ in the $CW_1$ of the current transmission.

In the fourth example, the following steps are included.

(1) The transmitter uses the number of layers, being 3, during previous transmission, that is, 1 TB is transmitted by using the $CW_1$ and 2 TBs are transmitted by using the $CW_2$; for example, the $CW_1$ transmits the $TB_1$, the process number corresponding to the $TB_1$ is k, the $CW_2$ transmits the $TB_2+TB_4$, and the process number corresponding to the $TB_2$ is $k+N_1$.

(2) The transmitter receives a feedback, being the NACK, fed back by the receiver for the $CW_1$ transmitted last time and a feedback, being the ACK, for the $CW_2$.

(3) The transmitter determines, according to the feedbacks of the receiver, that 1 TB (the $TB_1$) included in the $CW_1$ needs to be retransmitted.

(4) 1 TB needs to be retransmitted, that is to say, the number of layers that need to be occupied for retransmitting the $CW_1$ is 1, so that the transmitter determines that the number of layers used in current transmission is 1.

(5) The TB that needs to be retransmitted is mapped according to the transport-block-to-codeword mapping corresponding to the RI being 2 shown by Table 2, to obtain a reprocessed codeword $CW_1$, that is, the $CW_1$ transmits the $TB_1$, the corresponding process number is still k, and the reprocessed codeword $CW_1$ is allocated, according to the layer mapping of the RI=1 in Table 1, to a transport layer for transmission.

(6) The transmitter sends data transmission related control information to the receiver, where the control information includes that: the RI of the current transmission is 1 and the process number indication is the process number being k of the $TB_1$ in the $CW_1$ of the current transmission.

In the fifth example, the following steps are included.

(1) The transmitter uses the number of layers, being 2, during previous transmission, that is, 1 TB is transmitted by using the $CW_1$ and the $CW_2$, respectively; for example, the $CW_1$ transmits the $TB_1$, the process number corresponding to the $TB_1$ is k, the $CW_2$ transmits the $TB_2$, and the process number corresponding to the $TB_2$ is $k+N_1$.

(2) The transmitter receives a feedback, being the ACK, fed back by the receiver for the $CW_1$ transmitted last time and a feedback, being the NACK, for the $CW_2$.

(3) The transmitter determines, according to the feedbacks of the receiver, that 1 TB (the $TB_2$) in the $CW_2$ needs to be retransmitted.

(4) 1 TB needs to be retransmitted, that is to say, the number of layers that need to be occupied for retransmitting the $CW_2$ is 1, so that the transmitter determines that the number of retransmission layers is 1.

(5) The TB that needs to be retransmitted is mapped according to the transport-block-to-codeword mapping corresponding to the RI being 1 shown by Table 2, to obtain a reprocessed codeword $CW_1$, that is, the $CW_1$ transmits the $TB_2$, the corresponding process number is still $k+N_1$, and the reprocessed codeword $CW_1$ is allocated, according to the layer mapping of the RI=1 in Table 1, to a transport layer for transmission.

(6) The transmitter sends data transmission related control information to the receiver, where the control information includes that: the RI of the current transmission is 1 and the process number indication is the process number being $k+N_1$ of the $TB_2$ in the $CW_1$ of the current transmission.

In the sixth example, the following steps are included.

(1) The transmitter uses the number of layers, being 2, during previous transmission, that is, 1 TB is transmitted by using the $CW_1$ and the $CW_2$, respectively; for example, the $CW_1$ transmits the $TB_1$, the process number corresponding to the $TB_1$ is k, the $CW_2$ transmits the $TB_2$, and the process number corresponding to the $TB_2$ is $k+N_1$.

(2) The transmitter receives a feedback, being the NACK, fed back by the receiver for the $CW_1$ transmitted last time and a feedback, being the ACK, for the $CW_2$.

(3) The transmitter determines, according to the feedbacks of the receiver, that 1 TB (the $TB_1$) in the $CW_1$ needs to be retransmitted.

(4) 1 TB needs to be retransmitted, that is to say, the number of layers that need to be occupied for retransmitting the $CW_1$ is 1, so that the transmitter determines that the number of retransmission layers is 1.

(5) The TB that needs to be retransmitted is mapped according to the transport-block-to-codeword mapping corresponding to the RI being 2 shown by Table 2, to obtain a reprocessed codeword $CW_1$, that is, the $CW_1$ transmits the $TB_1$, the corresponding process number is still k, and the reprocessed codeword $CW_1$ is allocated, according to the layer mapping of the RI=1 in Table 1, to a transport layer for transmission.

(6) The transmitter sends data transmission related control information to the receiver, where the control information includes that: the RI of the current transmission is 1 and the process number indication is the process number being k of the $TB_1$ in the $CW_1$ of the current transmission.

In the seventh example, the following steps are included.

(1) The transmitter uses the number of layers, being 4, during previous transmission, that is, two TBs are transmitted by using the $CW_1$ and the $CW_2$, respectively; for example, the $CW_1$ transmits the $TB_1+TB_3$, the process number corresponding to the $TB_1$ is k, the $CW_2$ transmits the $TB_2+TB_4$, and the process number corresponding to the $TB_2$ is $k+N_1$.

(2) The transmitter receives a feedback, being the NACK, fed back by the receiver for the $CW_1$ transmitted last time and a feedback, being the NACK, for the $CW_2$.

(3) The transmitter determines, according to the feedbacks of the receiver, that both codewords need to be retransmitted.

(4) The transmitter determines that the number of layers used in current transmission is 4, to transmit the both codewords ($CW_1$ and $CW_2$), or determines that the number of layers used in the current transmission is 2, to transmit some of the both codewords ($CW_1$ or $CW_2$).

If it is determined that the number of layers used in the current transmission is 4, data retransmission is performed according to the prior art.

If it is determined that the number of layers used in the current transmission is 2, retransmission of the $CW_2$ may be performed according to (5) and (6) in the first example, or the retransmission of the $CW_1$ may be performed according to (5) and (6) in the second example.

In the eight example, the following steps are included.

(1) The transmitter uses the number of layers, being 3, during previous transmission, that is, 1 TB is transmitted by using the $CW_1$ and 2 TBs are transmitted by using the $CW_2$; for example, the $CW_1$ transmits the $TB_1$, the process number corresponding to the $TB_1$ is k, the $CW_2$ transmits the $TB_2+TB_4$, and the process number corresponding to the $TB_2$ is $k+N_1$.

(2) The transmitter receives a feedback, being the NACK, fed back by the receiver for the $CW_1$ transmitted last time and a feedback, being the NACK, for the $CW_2$.

(3) The transmitter determines, according to the feedbacks of the receiver, that both codewords need to be retransmitted.

(4) The transmitter determines that the number of layers used in current transmission is 3, to transmit the both codewords ($CW_1$ and $CW_2$), or determines that the number of layers used in the current transmission is 1, to transmit some of the both codewords ($CW_1$), or determines that the number of layers used in the current transmission is 2, to transmit the other of the both codewords ($CW_2$).

If it is determined that the number of layers used in the current transmission is 3, data retransmission may be performed according to the prior art.

If it is determined that the number of layers used in the current transmission is 2, retransmission of the $CW_2$ may be performed according to (5) and (6) in the third example.

If it is determined that the number of layers used in the current transmission is 1, retransmission of the $CW_1$ may be performed according to (5) and (6) in the fourth example.

Figure 10:
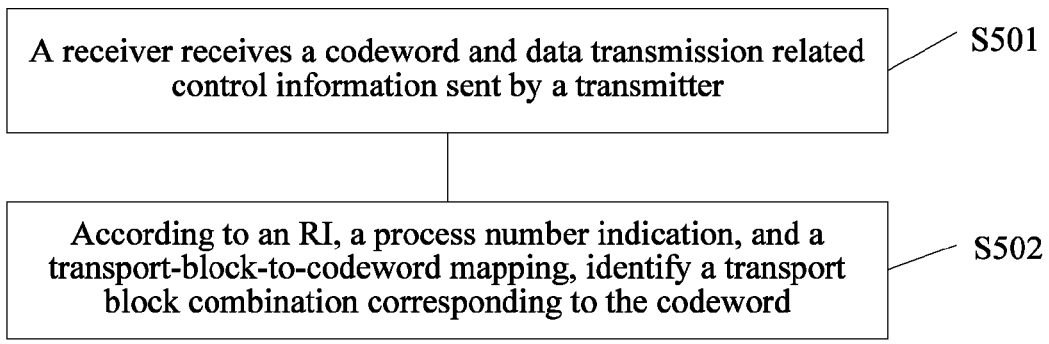
FIG. 10 is a schematic flow chart of another data retransmission method provided by an embodiment of the present invention.

An embodiment of the present invention further provides an MIMO data retransmission method, where how a receiver identifies a transport block combination corresponding to a codeword received by the receiver is mainly introduced, and as shown in FIG. 10, the method includes the following steps.

S501: A receiver receives a codeword and data transmission related control information sent by a transmitter.

The data transmission related control information includes: an RI and a process number indication. The process number indication is used to identify a process number of a transport block of the transmitter in current transmission, and a codeword, to which the transport block belongs, is called a specific codeword in the embodiment of the present invention.

S502: According to the RI, the process number indication, and a transport-block-to-codeword mapping, identify a transport block combination corresponding to the codeword.

For the transport-block-to-codeword mapping, reference may be made to the description in S403.

The transport-block-to-codeword mapping the transport-block-to-codeword mapping includes that: a codeword corresponds to transport blocks having a same process number or transport blocks having process numbers with a difference being in the foregoing given relationship.

For ease of description, in the embodiment of the present invention, an example is provided for description in which the specific codeword is a $CW_1$, and the non-specific codeword is a $CW_2$. Further, a process number corresponding to a first TB in the specific codeword $CW_1$ is used as a process number in the process number indication.

Optionally, the transport-block-to-codeword mapping includes that: when the number of layers used in the current transmission is 4, a process number of a transport block corresponding to the specific codeword and a process number of a transport block corresponding to the non-specific codeword are different, and a difference between the two process numbers is a first fixed value.

For example, when the RI received by the receiver is 4, that is, when the number of layers used in the current transmission is 4, the receiver may determine that the $CW_1$ and the $CW_2$ each include two transport blocks; if the process number in the process number indication received by the receiver is q ($0 \leq q < N_2$), it is identified that the process number of the first transport block included in the received $CW_1$ is q, a process number of the other transport block included in the $CW_1$ is q or $q+N_2$; a process number of a transport block included in the $CW_2$ is $(q+N_1) \mod(N_2)$ or $(q+N_1) \mod(N_2)+N_2$, and a process number of the other transport block included in the $CW_2$ is also $(q+N_1) \mod(N_2)$ or $(q+N_1) \mod(N_2)+N_2$.

Optionally, the transport-block-to-codeword mapping includes that: when the number of layers used in the current transmission is 3, a process number of a transport block corresponding to the specific codeword and a process number of a transport block corresponding to the non-specific codeword are different, and a difference between the two process numbers is a first fixed value.

For example, when the RI received by the receiver is 3, that is, when the number of layers used in the current transmission is 3, the receiver may determine that the $CW_1$ includes a transport block and the $CW_2$ includes two transport blocks; if the process number in the process number indication received by the receiver is q ($0 \leq q < N_2$), it is identified that the process number of the transport block included in the received $CW_1$ is q; a process number of a transport block included in the $CW_2$ is $(q+N_1) \mod(N_2)$ or $(q+N_1) \mod(N_2)+N_2$, and a process number of the other transport block included in the $CW_2$ is also $(q+N_1) \mod(N_2)$ or $(q+N_1) \mod(N_2)+N_2$.

Optionally, when the RI received by the receiver is 1, that is, the number of layers used in the current transmission is 1, the receiver may determine that the $CW_1$ includes a transport block; if a process number in the process number indication received by the receiver is q ($0 \leq q < N_2$), it is identified that a process number of the transport block included in the received $CW_1$ is q.

Further optionally, the transport-block-to-codeword mapping further includes that: when the number of layers used for transmission is 2, if two transport blocks are transmitted initially, or if the RI is 2 during previous transmission and the two transport blocks both need to be retransmitted and a difference between process numbers of the two transport blocks is the first fixed value, the process number of the transport block corresponding to the specific codeword and the process number of the transport block corresponding to the non-specific codeword are different, and a difference between the two process numbers is the first fixed value.

When the RI received by the receiver is 2, that is, the number of layers used in the current transmission is 2, step S502 may adopt any one of the following two manners.

Manner 1: When the number of layers used in the current transmission is 2, check whether buffered data corresponding to a retransmission binding process of a process indicated by the process number indication is correctly decoded; if the buffered data is not correctly decoded, identify that the process number of the transport block in the non-specific codeword and the process number in the process number indication are the same or in a given relationship (for example, a difference between the process numbers is a second fixed value $N_2$); if the buffered data is correctly decoded, identify that a difference between the process number of the transport block in the non-specific codeword and the process number in the process number indication is a first fixed value $N_1$.

In the embodiment of the present invention, a retransmission binding process of a process A refers to a process having a process number being the same as or in a given relationship with a process number of the process A (for example, a difference between the process numbers is the second fixed value). Therefore, a retransmission binding process of the process indicated by the process number indication refers to a process having a process number being the same as or in a given relationship with a process number in the process number indication (for example, a difference between the process numbers is the second fixed value).

For example, when the number of layers used in the current transmission is 2, the receiver may determine, according to the transport-block-to-codeword mapping shown by Table 2, that two codewords are received and each codeword includes a transport block.

If the process number in the process number indication received by the receiver is q(0≤q<N2), check whether buffered data corresponding to a retransmission binding process (the process q or a process q+N2) of the process q is correctly decoded; if the buffered data is not correctly decoded, it indicates that the transmitter needs to retransmit data through the retransmission binding process in the current transmission, so as to identify that the process number of the transport block in the CW1 is q, and the process number of the transport block in the CW2 is q or q+N2; if the buffered data is correctly decoded, it indicates that the transmitter does not use the retransmission binding process to transmit the transport block of the CW2 in the current transmission, so as to identify that the process number of the transport block in the CW1 is q, and the process number of the transport block in the CW2 is $(q+N_1)mod(N_2)$.

Manner 2: When the number of layers used in the current transmission is 2, check whether a packet of the data transmission related control information is configured with a special indication; if the packet is configured with the special indication, identify that the process number of the transport block in the non-specific codeword and the process number in the process number indication are the same or in a given relationship (for example, a difference between the process numbers is the second fixed value); if the packet is not configured with the special indication, identify that the difference between the process number of the transport block in the non-specific codeword and the process number in the process number indication is the first fixed value. The special indication is used to, when the number of layers used for transmission is 2, identify that the process numbers of the transport block in the non-specific codeword and the transport block in the specific codeword are the same or in a given relationship (for example, a difference between the process numbers is the second fixed value); and optionally, the special indication may be a fixed sequence.

Optionally, the special indication may be set in at least one control information field in the packet of the data transmission related control information, for example, one or more fields among a CCS field, a TBS field, an MI field, and so on; the special indication may also be set on an added bit of the packet of the data transmission related control information.

For example, when the number of layers used in the current transmission is 2, the receiver may determine, according to the transport-block-to-codeword mapping shown by Table 2, that two codewords are received and each codeword includes a transport block.

If the process number in the process number indication received by the receiver is q (0≤q<N2), check whether a transport block length indication of the non-specific codeword CW2 is set to the fixed sequence; if the transport block length indication is set to the fixed sequence, identify that the process number of the transport block in the CW1 is q, and the process number of the transport block in the CW2 is q or q+N2; if the transport block length indication is not set to the fixed sequence, identify that the process number of the transport block in the CW1 is q, and the process number of the transport block in the CW2 is $(q+N_1)mod(N_2)$.

Further, the receiver further needs to feed back HARQ-ACK information to the transmitter for the codeword in the current transmission.

When the number of layers used in the current transmission is 1 or 3 or 4, for a feedback method, reference may be made to the prior art.

If the number of layers used in the current transmission is 2 and the processes corresponding to the transport blocks (totally two transport blocks) in the two codewords received by the receiver are the retransmission binding processes to each other, when and only when the transport blocks in the two codewords are both correctly decoded, the receiver feeds back the ACK to the transmitter for the two codewords at the same time, and otherwise, feeds back the NACK at the same time.

For example, if the number of layers used in the current transmission is 2, the receiver receives two codewords, each codeword includes a transport block, a process number of one of the transport blocks is q (0≤q<$N_2$), and a process of the other transport block is q or q+$N_2$, in this case, when and only when the two transport blocks are both decoded correctly, the receiver feeds back the ACK to the transmitter for the two codewords, and otherwise, feeds back the NACK at the same time.

Further, the transmitter is further required to determine, according to HARQ-ACK information fed back by the receiver, whether transmission is successful.

If the HARQ-ACK information received by the transmitter for both the two processes being retransmission binding processes to each other is the ACK, the transmitter determines that the codewords transmitted by the two processes are both correctly decoded, and otherwise, when a maximum number of retransmissions is not reached, the codewords transmitted by the two processes need to be retransmitted again. That is to say, if the HARQ-ACK information of at least one of the two processes being retransmission binding processes to each other is the NACK, the codewords transmitted by the two processes both need to be retransmitted again, unless the maximum number of retransmissions is reached.

The embodiment of the present invention provides an MIMO-based data retransmission method. In the data retransmission processing process, when the transmitter needs to retransmit a part of codewords or all codewords, the transmitter determines that the number of layers used for transmission is the number of layers that need to be occupied for retransmitting the part of codewords or is the number of layers that need to be occupied for retransmitting a part of all the codewords, so as to avoid a case that the number of layers that are used is greater than the number of layers required for retransmitting a codeword and no new data needs to be transmitted, thereby enabling data retransmission to be performed normally.

An embodiment of the present invention further provides an apparatus corresponding to the data retransmission method, and for description of functional modules of the apparatus, reference may be made to the corresponding steps.

As shown in FIG. 11, an embodiment of the present invention provides a transmitter, including: a first determining unit 111, configured to, when a part of codewords or all codewords need to be retransmitted, determine that the number of layers used for transmission is the number of layers that need to be occupied for retransmitting the part of codewords or is the number of layers that need to be occupied for retransmitting a part of all the codewords; an allocating unit 112, configured to, allocate, through a layer mapping, transport blocks included in the part of codewords that need to be retransmitted or the part of all the codewords that need to be retransmitted to each transport layer corresponding to the number, determined by the first determining unit, of layers used for transmission; and a sending unit 113, configured to send data transmission related control information to a receiver, where the data transmission related control information includes a rank indication RI and a process number indication.

Optionally, the allocating unit 112 is specifically configured to map a transport block included in the part of codewords that need to be retransmitted or a part of all the codewords that need to be retransmitted, into a reprocessed codeword through the number of layers used for transmission and a transport-block-to-codeword mapping, and allocate, through the layer mapping, the reprocessed codeword to each transport layer corresponding to the number of layers used for transmission.

Optionally, the transport-block-to-codeword mapping includes that: a codeword corresponds to transport blocks having a same process number or transport blocks having process numbers with a difference being in the given relationship (for example, the difference between the process numbers is a second fixed value).

Further optionally, the transport-block-to-codeword mapping includes: the transport-block-to-codeword mapping further includes that: when the number of layers used for transmission is 2, if two transport blocks are transmitted initially, or if the RI is 2 during previous transmission and the two transport blocks both need to be retransmitted and a difference between process numbers of the two transport blocks is a first fixed value, a process number of a transport block corresponding to a specific codeword and a process number of a transport block corresponding to a non-specific codeword are different, and a difference between the two process numbers is the first fixed value.

Further, the transmitter further includes a setting unit 114. The setting unit is configured to, in a case that the number of layers used for transmission is 2 and a part of codewords in previous transmission in which RI>2 are retransmitted during current transmission, set at least one control information field of a packet including the data transmission related control information to a special indication, where the special indication is used to, when the number of layers used for transmission is 2, identify that process numbers of the transport block in the non-specific codeword and the transport block in the specific codeword are the same or in a given relationship (for example, the difference between the process numbers is the second fixed value); or, add a bit to a packet including the data transmission related control information, where the bit is used to transmit the special indication in a case that the number of layers used for transmission is 2 and the current transmission is to retransmit a part of codewords in the previous transmission in which RI>2.

Further, the transmitter further includes a receiving unit 115, configured to receive HARQ-ACK information for a process.

A second determining unit 116 is configured to, when HARQ-ACK information, for both two processes being retransmission binding processes to each other, received by the receiving unit is the ACK, the transmitter determines that codewords transmitted by the two processes are both correctly decoded; otherwise, determine that the codewords transmitted by the two processes both need to be retransmitted.

As shown in FIG. 12, an embodiment of the present invention further provides a receiver, including: a receiving unit 121, configured to receive a codeword and data transmission related control information sent by a transmitter, where the data transmission related control information includes an RI and a process number indication; and an identifying unit 122, configured to, according to the RI, the process number indication, and a transport-block-to-codeword mapping, identify a transport block combination corresponding to the codeword.

Optionally, the identifying unit 122 is configured to, when the RI is 2, check whether buffered data corresponding to a retransmission binding process of a process indicated by the process number indication is correctly decoded; if the buffered data is not correctly decoded, identify that the process number of the transport block in the non-specific codeword and the process number in the process number indication are the same or in a given relationship (for example, a difference between the process numbers is a second fixed value); if the buffered data is correctly decoded, identify that a difference between the process number of the transport block in the non-specific codeword and the process number in the process number indication is a first fixed value.

Optionally, the identifying unit 122 is configured to check whether the packet of the data transmission related control information is configured with a special indication; if the packet is configured with the special indication, identify that the process number of the transport block in the non-specific codeword and the process number in the process number indication are the same or in a given relationship (for example, a difference between the process numbers is the second fixed value); if the packet is not configured with the special indication, identify that a difference between the process number of the transport block in the non-specific codeword and the process number in the process number indication is the first fixed value, where the special indication is used to, when the number of layers used for transmission is 2, identify that the process numbers of the transport block in the non-specific codeword and the transport block in the specific codeword are the same or in a given relationship (for example, a difference between the process numbers is the second fixed value).

Further, the receiver may further include a feedback unit 123, configured to, if the number of layers used in the current transmission is 2 and the processes corresponding to the transport blocks in the two codewords received by the receiver are the retransmission binding processes to each other, and, when and only when the transport blocks in the two codewords are both correctly decoded, the receiver feeds back the ACK to the transmitter for the two codewords at the same time, and otherwise, feed back the NACK at the same time.

The present invention further provides a transmitter, including: a processor, configured to, when a part of codewords or all codewords need to be retransmitted, determine that the number of layers used for transmission is the number of layers that need to be occupied for retransmitting the part of codewords or is the number of layers that need to be occupied for retransmitting a part of all the codewords; and further configured to allocate, through a layer mapping, transport blocks included in the part of codewords that need to be retransmitted or a part of all the codewords that need to be retransmitted to each transport layer corresponding to the number, determined by the first determining unit, of layers used for transmission; and a sending component, configured to send data transmission related control information to a receiver, where the data transmission related control information includes a rank indication RI and a process number indication.

Optionally, the processor is specifically configured to map a transport block included in the part of codewords that need to be retransmitted or a part of all the codewords that need to be retransmitted, into a reprocessed codeword through the number of layers used for transmission and a transport-block-to-codeword mapping, and allocate, through the layer mapping, the reprocessed codeword to each transport layer corresponding to the number of layers used for transmission.

Optionally, the transport-block-to-codeword mapping includes that: a codeword corresponds to transport blocks having a same process number or transport blocks having process numbers with a difference being in the given relationship (for example, the difference between the process numbers is a second fixed value).

Further optionally, the transport-block-to-codeword mapping includes: the transport-block-to-codeword mapping further includes that: when the number of layers used for transmission is 2, if two transport blocks are transmitted initially, or if the RI is 2 during previous transmission and the two transport blocks both need to be retransmitted and a difference between process numbers of the two transport blocks is a first fixed value, a process number of a transport block corresponding to a specific codeword and a process number of a transport block corresponding to a non-specific codeword are different, and a difference between the two process numbers is the first fixed value.

Further, the processor is further configured to, in a case that the number of layers used for transmission is 2 and a part of codewords in previous transmission in which RI>2 are retransmitted during current transmission, set at least one control information field of a packet including the data transmission related control information to a special indication, where the special indication is used to, when the number of layers used for transmission is 2, identify that process numbers of the transport block in the non-specific codeword and the transport block in the specific codeword are the same or in a given relationship (for example, the difference between the process numbers is the second fixed value); or, add a bit to a packet including the data transmission related control information, where the bit is used to transmit the special indication in a case that the number of layers used for transmission is 2 and the current transmission is to retransmit a part of codewords in the previous transmission in which RI>2.

Further, the transmitter further includes a receiving component, configured to receive HARQ-ACK information for a process.

The processor is further configured to, when HARQ-ACK information, for both two processes being retransmission binding processes to each other, received by the receiving unit is the ACK, the transmitter determines that codewords transmitted by the two processes are both correctly decoded; otherwise, determine that the codewords transmitted by the two processes both need to be retransmitted.

An embodiment of the present invention further provides a receiver, including: a receiving component, configured to receive a codeword and data transmission related control information sent by a transmitter, where the data transmission related control information includes an RI and a process number indication; and a processor, configured to, according to the RI, the process number indication, and a transport-block-to-codeword mapping, identify a transport block combination corresponding to the codeword.

Optionally, the processor is configured to, when the RI is 2, check whether buffered data corresponding to a retransmission binding process of a process indicated by the process number indication is correctly decoded; if the buffered data is not correctly decoded, identify that the process number of the transport block in the non-specific codeword and the process number in the process number indication are the same or in a given relationship (for example, a difference between the process numbers is a second fixed value); if the buffered data is correctly decoded, identify that a difference between the process number of the transport block in the non-specific codeword and the process number in the process number indication is a first fixed value.

Optionally, the processor is configured to check whether the packet of the data transmission related control information is configured with a special indication; if the packet is configured with the special indication, identify that the process number of the transport block in the non-specific codeword and the process number in the process number indication are the same or in a given relationship (for example, a difference between the process numbers is the second fixed value); if the packet is not configured with the special indication, identify that a difference between the process number of the transport block in the non-specific codeword and the process number in the process number indication is the first fixed value, where the special indication is used to, when the number of layers used for transmission is 2, identify that the process numbers of the transport block in the non-specific codeword and the transport block in the specific codeword are the same or in a given relationship (for example, a difference between the process numbers is the second fixed value).

Further, the receiver may further include a sending component, configured to, if the number of layers used in the current transmission is 2 and the processes corresponding to the transport blocks in the two codewords received by the receiver are the retransmission binding processes to each other, and when and only when the transport blocks in the two codewords are both correctly decoded, the receiver feeds back the ACK to the transmitter for the two codewords at the same time, and otherwise, feed back the NACK at the same time.

An embodiment of the present invention further provides a data retransmission system, including a transmitter and a receiver. The transmitter is configured to, when a part of codewords or all codewords need to be retransmitted, determine that the number of layers used for transmission is the number of layers that need to be occupied for retransmitting the part of codewords or is the number of layers that need to be occupied for retransmitting a part of all the codewords; allocate, through a layer mapping, transport blocks included in the part of codewords that need to be retransmitted or a part of all the codewords that need to be retransmitted to each transport layer corresponding to the number, determined by the first determining unit, of layers used for transmission; and send data transmission related control information to the receiver, where the data transmission related control information includes a rank indication RI and a process number indication.

The receiver is configured to receive the codeword and the data transmission related control information, which are sent by the transmitter, where the data transmission related control information includes the RI and the process number indication; and identify a transport block combination corresponding to the codeword according to the RI, the process number indication, and a transport-block-to-codeword mapping.

The embodiments of the present invention provide an apparatus and a system. In the data retransmission processing process, when the transmitter needs to retransmit a part of codewords or all codewords, the transmitter determines that the number of layers used for transmission is the number of layers that need to be occupied for retransmitting the part of codewords or is the number of layers that need to be occupied for retransmitting a part of all the codewords, so as to avoid a case that the number of layers that are used is greater than the number of layers required for retransmitting a codeword, thereby enabling data retransmission to be performed normally.

Through the foregoing description of the implementation manners, a person skilled in the art may clearly understand that the present invention may be implemented in a manner of software plus necessary universal hardware, and definitely, may also be implemented by hardware; however, in most cases, the former is a preferred implementation manner. Based on such understanding, the technical solutions of the present invention essentially, or the part contributing to the prior art may be implemented in a form of a software product. The computer software product may be stored in a readable storage medium, for example, a floppy disk, hard disk, or optical disc of the computer, and includes several instructions used for instructing a computer device (which may be a personal computer, a server, a network device, or the like) to perform the method described in each embodiment of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data retransmission method, comprising:
   determining, in response to a codeword needing to be retransmitted and no new data needing to be transmitted, a special codeword according to a difference between a first number of layers selected by a transmitter for retransmitting a codeword and a second number of layers needed for retransmitting a single instance of the codeword, wherein the second number of layers needed for retransmitting the codeword is smaller than the first number of layers selected by the transmitter, and wherein the special codeword has a number of transport blocks that is equal to the difference;
   allocating the codeword that needs to be retransmitted and the special codeword to each transport layer through a layer mapping; and
   transmitting the codeword and the special codeword together and according to the allocation of the codeword and the special codeword to each transport layer, wherein the special codeword, when transmitted, includes no new data that needs to be transmitted or retransmitted.

2. The method according to claim 1 wherein the special codeword is a virtual codeword, and the virtual codeword is void information or wherein the special codeword is a filling codeword and the filling codeword is any non-void information.

3. The method according to claim 1, further comprising sending a special codeword transmission indication to a receiver, wherein the special codeword transmission indication is used to identify that current data transmission comprises a special codeword.

4. The method according to claim 3, wherein sending the special codeword transmission indication comprises carrying the special codeword transmission indication on a high speed shared control channel (HS-SCCH).

5. The method according to claim 4, wherein carrying the special codeword transmission indication on an HS-SCCH comprises:
   adding a bit to a packet comprising data transmission related control information, the bit identifying the special codeword transmission indication and carrying the packet on the HS-SCCH; or
   setting at least one control information field in a packet comprising data transmission related control information to a specific value, which is used to identify the special codeword transmission indication, and carrying the packet on the HS-SCCH.

6. The method according to claim 3, wherein the special codeword transmission indication is further used to identify which codeword is a special codeword, or to identify which codeword is the codeword to be transmitted.

7. A transmitter, comprising:
   a processor; and
   a computer-readable storage medium storing a program to be executed by the processor, the program including instructions for:
      determining, in response to a codeword needing to be retransmitted and no new data needing to be transmitted, a special codeword according to a difference between a first number of layers selected by a transmitter and a second number of layers needed for retransmitting a single instance of a codeword, wherein the second number of layers needed for transmitting the codeword is smaller than the first number of layers selected by the transmitter, and wherein the special codeword has a number of transport blocks that is equal to the difference;
      allocating the codeword that needs to be retransmitted and the special codeword to each transport layer through a layer mapping; and
      transmitting the codeword and the special codeword together and according to the allocation of the codeword and the special codeword to each transport layer, wherein the special codeword, when transmitted, includes no new data that needs to be transmitted or retransmitted.

8. The transmitter according to claim 7, further comprising a communication interface, configured to send a special codeword transmission indication to a receiver, wherein the special codeword transmission indication is used to identify that current data transmission comprises a special codeword.

* * * * *